(12) United States Patent
Ziv-El

(10) Patent No.: US 6,302,698 B1
(45) Date of Patent: Oct. 16, 2001

(54) METHOD AND APPARATUS FOR ON-LINE TEACHING AND LEARNING

(75) Inventor: Jakob Ziv-El, Herzliya (IL)

(73) Assignee: Discourse Technologies, Inc., Mequon, WI (US)

(*) Notice: Subject to any disclaimer, the term of this patent is extended or adjusted under 35 U.S.C. 154(b) by 0 days.

(21) Appl. No.: 09/250,687

(22) Filed: Feb. 16, 1999

(51) Int. Cl.[7] ........................................ G09B 7/04
(52) U.S. Cl. ........................ 434/323; 322/350; 322/336
(58) Field of Search .................................. 434/350, 322, 434/323, 336

(56) References Cited

U.S. PATENT DOCUMENTS

| | | |
|---|---|---|
| 5,002,491 | 3/1991 | Abrahamson et al. . |
| 5,176,520 * | 1/1993 | Hamilton .................. 434/350 X |
| 5,263,869 | 11/1993 | Ziv-El . |
| 5,344,326 * | 9/1994 | Ferris ........................ 434/336 X |
| 5,437,555 | 8/1995 | Ziv-El . |
| 5,788,508 * | 8/1998 | Lee et al. .................. 434/350 X |
| 5,823,788 * | 10/1998 | Lemelson et al. .......... 434/350 X |
| 5,957,699 * | 9/1999 | Peterson et al. ............ 434/350 X |
| 5,978,648 * | 11/1999 | George et al. .............. 434/362 X |
| 6,112,049 * | 8/2000 | Sonnenfeld ................. 434/350 X |
| 6,175,834 * | 6/1998 | Cai et al. ................... 707/102 X |

* cited by examiner

Primary Examiner—Valencia Martin-Wallace
Assistant Examiner—Chanda Harris
(74) Attorney, Agent, or Firm—Quarles & Brady LLP

(57) ABSTRACT

A networked teaching and learning system (1, 9, 29) having a plurality of student computers (9), a network server (29, 6) and at least one teacher's computer (1) includes comparison and evaluation logic (200–232) in communication with the student computers (9) for comparing and evaluating each student keystroke with the characters of an answer, if any, immediately after every student keystroke. The system (1, 9, 29) provides character-by-character evaluation for quick learning feedback for students, as well as simultaneous observation at the teacher's computer (1) of multiple student responses identified as correct or incorrect. The system operates (1, 9, 29) in a Hybrid Mode, which combines the Social Mode and the Self-paced Mode. The system (1, 9, 29) enables quick construction of various exercise types, the scoring of unanticipated responses, and the introduction of an explanation component in addition to a direct response to a question. Log-on methods for systems with multiple teachers are also disclosed.

37 Claims, 20 Drawing Sheets

| BUTTON OR KEYSTROKE | EQUIVALENT CHARACTER |
|---|---|
| CLASS DISPLAY | C |
| ENTER | <13> |
| PLEASE ANSWER | P |
| SOCIAL | S |

FIG. 19

| MODE | SOCIAL BUTTON | NEXT AND PREVIOUS | GO TO + FRAME NUMBER |
|---|---|---|---|
| SOCIAL | IN | ABSENT | ABSENT |
| LINEAR | OUT | PRESENT | PRESENT |
| HYBRID | OUT | PRESENT | ABSENT |

FIG. 20

RESPONSE DISTRIBUTION REPORT
    TEXT
    BAR GRAPH
    PIE CHART

SUMMARY REPORT
    DYNAMIC
    PRINTED
    INDIVIDUAL
    ONE STUDENT

DETAIL REPORT
    DYNAMIC
    PRINTED
    INDIVIDUAL
    ONE STUDENT

RESPONSES REPORT
    WITH NAMES
    ANONYMOUS
    INDIVIDUAL

QUESTION REPORT
    CLASS
    ONE FRAME

VOTE REPORT
    PRINTED
    BAR GRAPH
    PIE CHART

STUDENT ACTIVITY REPORT

FIG. 21

METHOD AND APPARATUS FOR ON-LINE TEACHING AND LEARNING

TECHNICAL FIELD

This invention relates to on-line teaching and monitoring of student learning on a plurality of computer devices connected via a computer network.

BACKGROUND ART

Known computer-based educational systems typically include a plurality of student terminals, but do not necessarily include a terminal for the teacher to communicate with the students. In these instances, active teaching may take place away from the network or off-line. The present invention is concerned with the teacher being on-line as an active participant.

Known computer-based education systems rely on a pre-authored stored lesson program, comprising a multiplicity of frames. Lessons are delivered in either Social Mode, which means that the teacher advances a group of students through a lesson, frame by frame, via the teacher's computer, or in Self-paced Mode (also called Independent Mode) where each student individually advances at his or her own pace through a lesson, frame by frame, while the teacher observes the work on the teacher's monitor. Such a system, involving a single teacher, is described in J. Ziv-El, U.S. Pat. No. 5,263,869 issued Nov. 23, 1993, a prior patent of the inventor herein.

Another system, including both Social and Self-paced Modes, in which a single teacher teaches clusters of students in remote places is described in J. Ziv-El, U.S. Pat. No. 5,437,555 issued Aug. 1, 1995, another prior patent of the inventor herein.

The above single teacher systems are based on a multiplexor polling system which communicates on an individual byte basis, which is ideal for the applications described there, since the logic operates on a character by character basis. However, where multiple teachers may be involved on a large school-wide network and require a central database, packet switched networks have cost advantages, particularly if the network is used by the school for a variety of applications.

The problem is that while packet-switched networks have greater data throughput, each packet may comprise 512 bytes or more. The present process may require only a single or a very small number of bytes per package, along with overhead data needed for addressing, checksums and error correction. Thus there are speed limitations with the way existing packet switched networks, such as those running on the IPX/SPX (Internetwork Packet Exchange/Sequenced Packet Exchange) protocol, or TCP/IP (Transfer Control Protocol/Internet Protocol), can be used for educational exercises, which require the automatic provision of reinforcement feedback signals to a large number of students.

It is one object of the present invention to provide letter-by-letter or final letter reinforcement feedback signals in packet-switched networks at the speed that students type. It is clear that the problems will show up in larger networks, and networks with greater distribution of teachers and students.

In many existing systems, a student responds to a question and then must press the "Enter" key before the system informs the student whether the student entry is right or wrong. This provides two disadvantages. The first is the introduction of a period of anxiety in the interval between typing the last character of the response and getting the feedback signal for learning reinforcement. The second is the inability of the student to know, while still typing, whether he or she is on the right track.

It is important that a teacher is able to monitor in real time, a large number of student responses simultaneously, and receive information on their correctness, even while students are still busy typing, i.e. with very little delay between a student typing a character and the teacher seeing the character typed. This is in contrast to asking a question and then giving students a predetermined time in which to respond to the question before seeing their responses. During the waiting period for completed responses, the teacher is essentially off-line. The latter method not only wastes time with fast students, but also may cut short slow students. A teacher often asks a question, but in view of the responses of the first few students to respond, may desire to stop the current responses, and re-phrase the question, thereby saving time in progressing through the lesson. Also, if the teacher were to come back on-line only after responses had been completed, the students would be forced to wait while the teacher reviewed the responses, which is unacceptable for most teachers. Abrahamson et al., U.S. Pat. No. 5,002,491 issued Mar. 26, 1991, describes a system which does not provide fast reinforcement feedback to the students as described, and which does not allow the teacher to see responses of a large number of students simultaneously, or information on their correctness, as they are being typed.

There are also many limitations with the way known lesson programs are constructed. Typically, a frame includes the question, which is to appear in a given layout on a student's screen with a designated place for the response, and the correct answer. A limitation with this approach is that the response is often not as valuable to the teacher as the explanation on how the response, whether right or wrong, was derived.

There are various exercise types that can be programmed into a lesson for automatic marking for correctness of student responses. These exercise types include multiple choice questions; question & short answer(s), which requires one or more short answers to a question; a requirement to fill in specific words into specific places in a sentence (fill-in-the-blanks) and the laying out of a specific list of characters in a pattern on the screen, for example, that which is required in a long multiplication of two multi-digit numbers (route).

Current authoring methods are cumbersome for the creation of some exercise types, in particular fill-in-the-blanks and route types, because it involves the laying out of the question with the correct size spaces where the fill-ins are to occur and the separate listing of the words or characters which are to be filled in, and finally, the indication of the correct order of these words. Since speed is essential when a teacher authors a question online while teaching, a better method of executing the authoring and transmission of these exercise questions is needed.

It is also desirable to give teachers a system which would enable a teacher to verbally ask a question, receive all the responses, score them, provide positive reinforcement feedback to students, obtain a statistical record of performance and have a written record for later review of this whole process, particularly including the question.

Another limitation with existing lesson programs is that the final score immediately after a lesson is completed, only reflects whether students have responded to particular questions correctly or incorrectly, according to the programmed answer. Unanticipated correct responses are scored as incorrect, without regard as to whether in the view of the teacher, a response is partly correct, thereby deserving an intermediate score.

Similarly, if the question is programmed to give a student a reinforcement feedback signal for a correct response, students who have given unanticipated correct responses do not receive reinforcement. Also a teacher is unable to selectively encourage a student with a learning disability who has a partially correct response, by giving this student a correct reinforcement feedback signal, to the exclusion of non-disabled students with the same response.

There is also a need in a classroom, in which students are working in a Self-paced Mode, for the teacher to be able to send a message to a student who is still busy with a response that the teacher is not satisfied with it, without disturbing the other students, so that the student is interrupted and forced to acknowledge the response, possibly with a comment of his own.

There is also a need for a lesson type, to be referred to as hybrid mode, in which Self-paced Mode frames are interspersed between social mode frames, so that a teacher may give self-paced exercises to students while basically teaching in social mode.

When a teacher teaches in Social Mode with a prepared lesson program while advancing frame by frame, each advance usually comprises several keystrokes, including indicating the next frame number, displaying to the students a message or question on the Class Display, actuating any Audio Visual (A-V) Media which are programmed into the lesson, and finally the teacher must press a key to signal to the students that the teacher requests responses. A problem with this frame driven approach is that the operation of the system by the teacher is more difficult to learn. Hence, there is also a need for a function where by pressing a button, the lesson advances, task by task, i.e. it is task driven, where every keystroke is educationally more meaningful by skipping intermediate operational steps.

In the case of a school-wide computer network, with several teachers teaching simultaneously in different classrooms, each with a multiplicity of groups, there must be no perceptible degradation of the speed with which all students are provided with reinforcement signals on a character by character basis.

There is also a need to maintain a log-on procedure which binds a class of students to a particular teacher, whether the system uses a wired or a wireless network, or portable computers. There is also a need here for showing the student seat numbers, with the student names and responses, for identification purposes.

There is also a need to maintain a common single database on lessons and student and teacher performance in the whole school. There is also a need for students who are not present in a classroom through illness or for other reasons, to join the students in the classroom through the Internet, without a perceptible degradation of the speed with which these students are provided with reinforcement signals.

There is also a need for the teacher to be able to take a student's response and not only place it on the Class Display for viewing and verbal discussion, but also to broadcast it on the screens of students, who are partaking in the same lesson, particularly if they are located remotely on the Internet.

The present invention overcomes the limitations outlined and introduces new benefits to on-line teaching systems.

SUMMARY OF THE INVENTION

To overcome the limitations of the prior art described above, and to overcome other limitations that will become apparent upon reading and understanding the present specification, the present invention provides an on-line teaching and learning system with rapid character-by-character reinforcement signals for students, and simultaneous monitoring by the teacher of the actual responses as well as their correctness, even with packet switched networks, whether for single teacher or multiple teacher systems, and whether the students are present in the school or are remotely located and connected via the Internet.

The present invention provides for a teaching strategy where the students are given a question in a frame, which requires them to respond both in the form of an answer which is automatically scored by the system, as well as with an explanation which can be subjectively evaluated by the teacher.

The present invention provides a complete record and performance statistics on spontaneously created frames, and frames involving student responses to verbal questions.

The present invention provides simple authoring means for fill-in-the-blanks and route exercise type frames.

The present invention permits full or intermediate online scoring of unanticipated responses.

The present invention permits the awarding, on-line, of reinforcement feedback signals to one or all students for a particular unanticipated answer.

The present invention provides a means for sending a private message by the teacher to a student while the student is responding to a question.

The present invention permits a hybrid mode teaching strategy.

The present invention permits a task-driven presentation of a social mode lesson.

The present invention provides, in a school-wide, multiple teacher network, log-on methods which bind a class to a particular teacher in a wired or wireless network with portable computers. Also provided is an automatically maintained central database.

The present invention provides for student identification by seat number, even where the student terminals are moveable.

The present invention provides for a student's response to be broadcast by the teacher to local students in a classroom or to students located remotely and connected via the Internet.

In the following description of the preferred embodiment, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

BRIEF DESCRIPTION OF THE DRAWINGS

FIG. 19 shows a table with some keyboard equivalents of button clicks and keystrokes;

FIG. 20 shows a table with student screen button inputs for various modes of lesson delivery; and FIG. 21 shows a list of reports available from the Reports pull-down menu in FIG. 5.

DETAILED DESCRIPTION OF THE PREFERRED EMBODIMENTS

Figure 1:
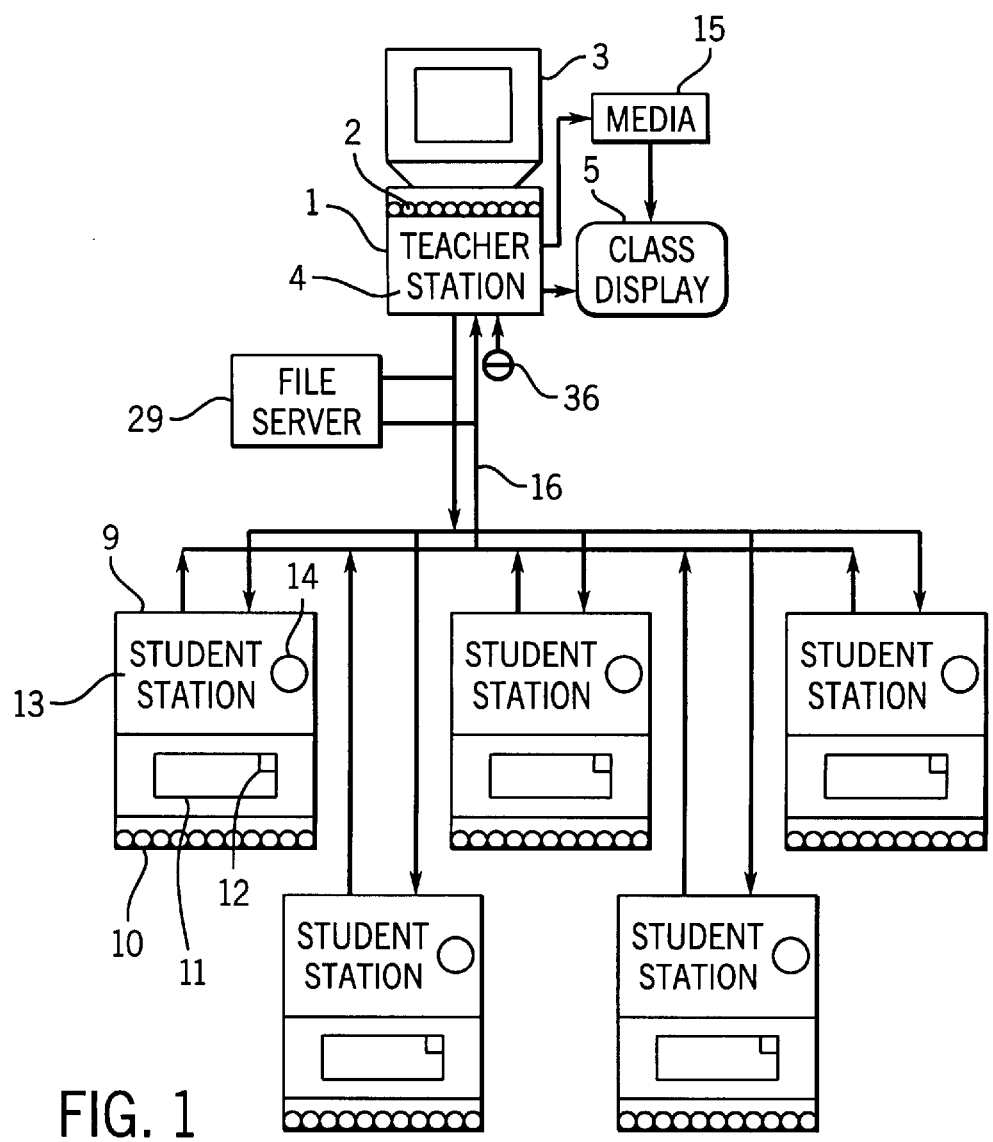
FIG. 1 is a schematic block diagram showing the interconnections of the main components of an on-line teaching and learning system according to the invention.

FIG. 1 is a schematic block diagram showing the interconnections of the main components of an on-line teaching and learning system according to the invention, including a teacher's computer 1 and five student computers 9 (out of a much larger number). The teacher's computer 1 includes an input device 2 (such as a keyboard, a mouse or similar means for selecting a character or an item on a screen as well as bar code reader apparatus, by which characters can be read and input to simulate keystrokes on a keyboard) and an output device, in this example, a 17-inch color monitor 3. In this description, the term "computer" shall mean an item of equipment including a central processor, a memory, at least one input device and and at least one output device. This definition shall extend to and include diskless network terminals. The input devices and output devices may be shared with other computers, and could in the broadest sense include input port and output ports. Output ports are provided such as an RS-232C to operate A-V media devices 15, like a video disk, which operates in conjunction with the class display 5 for viewing by the whole class. A video display card like an Astra Multiport card inside the teacher's computer 1, provides two video outputs for the monitor 3 and the class display 5, so that at any one time, the image on one screen can be manipulated independently of that on the other. A microphone 36 can be connected to a sound card, within the teacher's computer 1, and voice-to-text software can be integrated with the main application program 4, as will be described.

Also connected to the network physical signaling medium 16 is the file server 29 and student computers 9. Such a medium 16 can be provided by network cabling, or through low power radio frequency (RF) signals or through infra-red (IR) signals. The network employs a packet switching communication protocol, such as IPX/SPX. Each student computer 9 includes a full alphanumeric keyboard 10, and a screen 11 and is provided with a speaker or beeper 14 capable of emitting sounds to act as an audio feedback signal for learning reinforcement of the correctness of a response or to alert the student to respond to a teacher's request. A learning reinforcement feedback signal can be either an audio signal from the speaker 14, or a visual reinforcement feedback signal, or both. The visual reinforcements signal is provided by a light 12 or a place on the screen 11, which goes on or flashes in different modes and also acts as a learning reinforcement feedback signal. The output devices for these signals, comprising speaker 14 and light 12, are said to emit predetermined reinforcement signals, in that the signals are normally of two fixed types, although a larger number is possible. The first type is, for example, a steady light accompanied by a short beep for a correct letter typed by a student (referred to as letter-by-letter reinforcement), and the second type is a flickering light accompanied by a 3-note beep at the end of a correct response (referred to as final letter reinforcement). The second type may sometimes be given without the first depending on the reinforcement feedback mode selected by the teacher when authoring a frame, however, the first type is normally accompanied by the second type, at the end of a correct answer. Also, instead of flashing lights one can use say inverse video characters (i.e. white on black) on the student's screen 11 for correct and normal (black on white) for incorrect, with a flashing cursor when completing a correct response.

In the case of an IPX/SPX communication protocol one can have an NOS (Network Operating System) running on top of another OS (Operating System) or one can have a system like NetWare which integrates network functions and OS functions in a single OS on the File Server 29.

The main part of the on-line teaching and learning program of the present invention, which will be referred to as the main application program 4, resides in the computer of the teacher's computer 1, which is a reasonably fast computer which utilizes a Pentium or Pentium II microprocessor available from Intel Corporation or other computers of equivalent computing capacity. The computers of the student computers 9, have a less demanding and smaller application program 13, which can run on a slower computer, including a palmtop which has a network card supporting the IPX/SPX protocol.

The main application program 4, has to perform many functions practically simultaneously, including displaying a screen full of student names and responses in real time, as they are being generated, while keeping track of performance by displaying right and wrong answers in different colors, together with performance bar graphs in real time, and keeping score of all students. This, in combination with the packet switched traffic when a large number of students are working, makes the supplying of immediate reinforcement signals to students potentially difficult.

Accordingly, one way for speeding up the system is for it to run on an interrupt-driven or event-driven basis so that no time is wasted in polling student computers which are inoperative. A further consideration is whether the comparison and evaluation logic to be described with reference to FIG. 4, is to be located centrally, for example, in the main application program 4 in FIG. 1 (or in network client program 34 for the teacher shown in FIG. 2,) or locally in the student application program 13 in FIG. 1 (or in network client program 33 and 35 for the students in FIG. 2.). In order to determine the correctness of a response and consequently the score and feedback to be given, the comparison logic compares each keystroke of a student response at the time it is typed, with the homologous character of the authored correct answer(s), while taking into account the judging modes, as well as the explanation component and X-Y co-ordinates, as will be described with reference to items 61–66, 71 and 78–80 in FIG. 3B. Based on the result of the comparison and evaluation and the reinforcement feedback mode items 68–70 of FIG. 3B, the type of feedback given to a student is determined.

Accordingly, the computer program logic for judging the correctness of a student response against the authored answer(s) in a frame, and the supplying of the fixed reinforcement signals by the speaker 14 and the light 12, may for large systems be incorporated in the relatively independent student application program 13, thereby distributing the processing load and speeding up the system.

Figure 2:
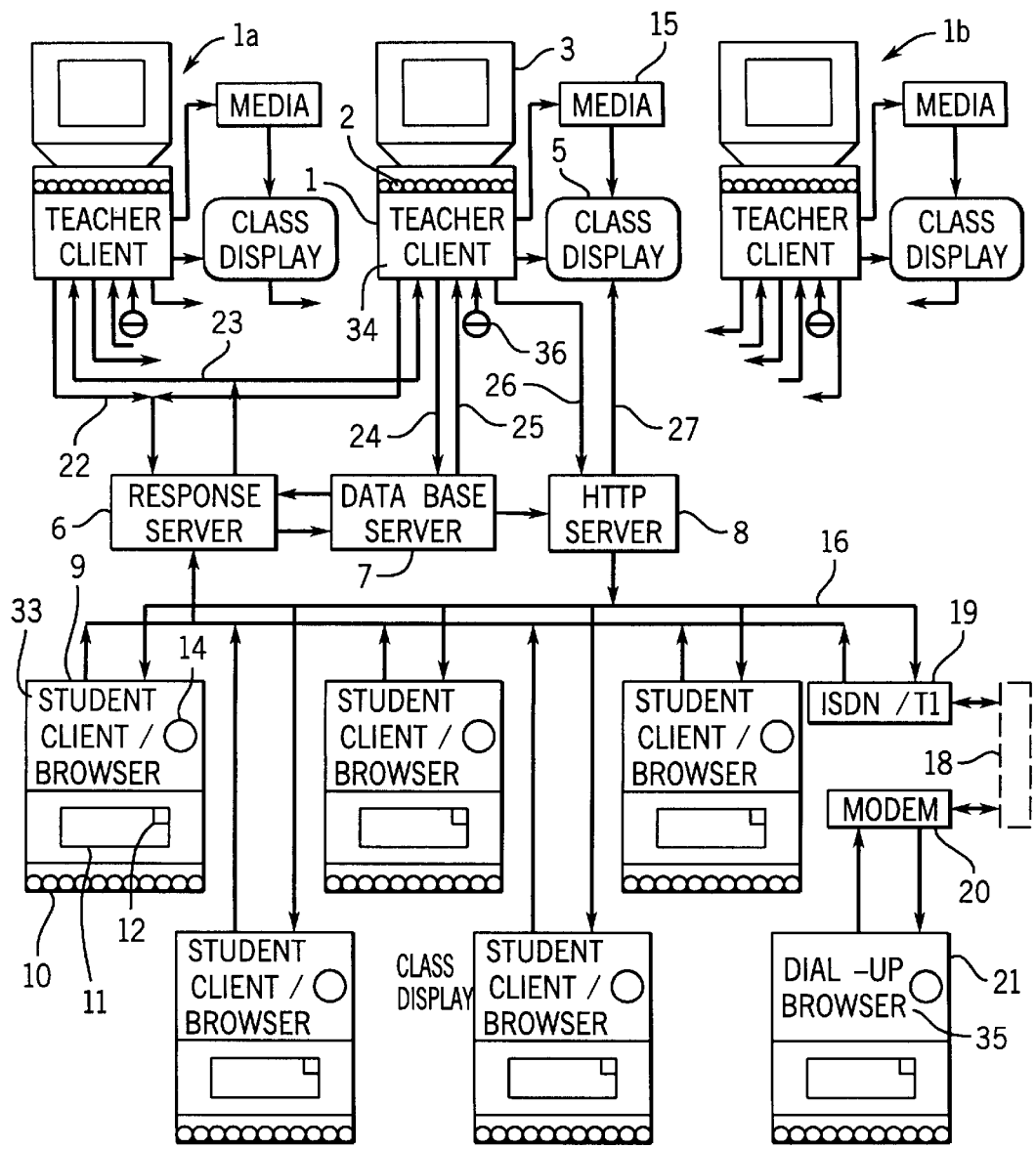
FIG. 2 is a schematic block diagram showing the interconnections of the main components of a packet switched, Internet compatible system according to the invention.

FIG. 2 shows another embodiment of the invention, comprising a network server-client architecture configured for teaching and learning in a school, including three teacher computers 1, 1a and 1b, a large number of student computers 9 of which six are shown, with one of the student computers 21 being located outside the school and utilizing a long distance communication facility like the Internet, which potentially presents additional impediments to fast judging and supplying of reinforcement signals to the remote student. In FIG. 2, each teacher's computer 1 includes a keyboard 2 (which includes a mouse and, if used, a bar code reader apparatus) and a color monitor 3, the memory or hard disk of the computer 1 being loaded with a teacher's client application program 34. (Computers may be disclose terminals, and when communicating over a network to server computers, may be referred to as clients.) As in FIG. 1, output ports are provided for supporting A-V Media 15 and a class display 5. Also shown is a microphone 36 which can be connected to a sound card within the computer of the teacher's computer 1. Voice-to-text program can be integrated with the teacher's client program 34, to be used as will be described.

The operating system for the system in FIG. 2 is preferably the Windows NT Operating System available from Microsoft. The operating system is installed on a Pentium II based server computer along with an associated web server module shown as the HTTP server application 8 in FIG. 2. Also installed on the server computer is a response server application 6, which supervises communication between all other application programs. The teacher client application 34 also operates with a Windows 95/98/NT operating system, and can therefore be operated on the same computer as applications 6, 8, or on a separate computer. A database application program, represented by element 7 in FIG. 2, utilizes a commercially available database application such as Microsoft Access, SQL Server, Oracle or another suitable ODBC application. Typically, the database server application 7 resides on its own dedicated computer, and is accessed by the other server applications 6, 8.

The student computers 9 in FIG. 2 execute JAVA applets and display HTML pages transmitted from the HTTP server application 8. The student computers 9 store and execute a commercially available browser program, such as Microsoft Explorer 4.0 or Netscape Navigator 4.0.5.

The teacher client application 34 and the server applications 6, 7 and 8 are developed using Microsoft Visual C++, an object oriented programming system, which uses MFC (Microsoft Foundation Classes).

The response server application 6, the database server application 7 and an HTTP (Hypertext Transport Protocol) server application 8 communicate in the same way to each of the computers of the three teacher computers 1, 1a and 1b, via lines 22, 23, 24, 25, 26 and 27, the arrows showing direction of information flow. (In FIG. 1, which shows a system for a single teacher, the computer of the teacher's computer 1, in combination with the network file server 29, carries out these combined functions.)

The servers 6, 7 and 8 may be located on one or more separate computers, or by running, in a multi-tasking mode, on the computer of the teacher's computer 1. If servers are located on different computers, TCP/IP is employed, and if located on the same computer, a standard function API (Application Programming Interface) is used, which is a program interface that links a module to the underlying server.

FIG. 2 shows five student computers 9 located within the school and one student computer 21 located remotely and connected via an ISP (Internet Service Provider) 19, which, if the ISP for the remote student is not the same as that of the school, can introduce relatively large communication delays. Each student computer 9 or 21 includes a computer with a full alphanumeric keyboard 10, and a screen 11 operating under a relatively simple operating system, such as Windows CE, or on another platform like a Macintosh computer. Also provided is a speaker or beeper 14, and a light or visual reinforcement signaling means 12, as in FIG. 1.

The student computers 9 communicate with the response server 6 and the HTTP server 8, also using the TCP/IP protocol. The HTTP server 8 provides for the correct communication protocol for retrieval of hypertext (HTML) documents by student computers 9 and 21.

The remote student computer 21 is connected to the rest of the network via the ISP 19 and modem 20. Although it is most desirable to have equipment that connects users to their ISP to have as large a data transmission rate as possible, economic considerations prevail. Thus, at the student end, if an ISDN (Integrated Services Digital Network) Internet connection with a speed of 128 Kbps is not affordable, a modem 20 as shown in FIG. 2, working at 28.8 Kbps or slower is used. At the school, an ISDN line or a derivative such as frame relay, which is packet switching with most of the overhead bits removed, may be used for a low number of students although the more expensive T-carrier connection, referred to as T1 to T4, with a speed of at least 1.544 Mbps is preferred. The two alternatives are shown in block 18 in FIG. 2.

The student computers 9 and 21 all receive information from the HTTP server 8, via the browser program, in the form of HTML pages, which is the language used on the WWW (World Wide Web). This results in User Interface compatibility between what the local and remote students experience.

The network client program 34 for the teacher, includes the basic Network Operating System, the dial-up program for accessing the Internet and the main application program for teaching mentioned with respect to FIG. 1. The programming 33 and 35 on the student computers 9 and 21, includes a client program module and a browser program module, while the programming 35 on the remote student computer 21 also includes a dial-up communication program.

The comparison and evaluation logic described with reference to FIG. 4, for judging the correctness of a student response and deciding on the feedback to be given, can be located centrally at the network client program module 34 for the teacher (or main application program 4 in FIG. 1) for smaller systems, or, for larger systems it can be added locally to the network client program modules 33 and 35 for the student (or the student application program 13 in FIG. 1). In the case of the client program modules 33 and 35 for the student that are seen in FIG. 2, it is added in at least one of three ways.

The first way is in the form of an applet, since HTML documents provide for embedding of actual programs in the form of an applet using Java programming language, so that a browser can download it and execute it.

The second way is in the form of a plug-in module which is program which is installed in a browser program and extends the browser's capabilities.

The third way is in the form of a helper application, which is installed as a stand alone application and is not part of the browser. When the browser encounters an HTML message that requires the helper application, it uses it.

In the case where the comparison and evaluation logic of FIG. 4 is added locally, the result of the comparison and evaluation of a student's response against the authored answer is sent together with the character typed to the response server 6, and determines the color coding of the responses as they appear on the teacher's monitor 3. Also this result of the comparison and evaluation in combination with the authored reinforcement feedback mode 68 to 70 as explained with reference to FIG. 3B, causes immediate visual and/or audio reinforcement feedback signals via speaker or beeper 14 and light 12 to be supplied to the student.

It is also possible for parts of the comparison and evaluation logic to be located both centrally, to determine the color coding of the responses, and locally, to determine the immediate reinforcement feedback at each student computer. If the comparison and evaluation logic is wholly located centrally, then color coding and reinforcement feedback is determined from the central location.

In describing elements of the application programs and data generated by such programs, the following definitions will be used.

A "lesson" or "lesson template" is a collection of exercises or frames to be delivered to a class of students.

Figure 3A:
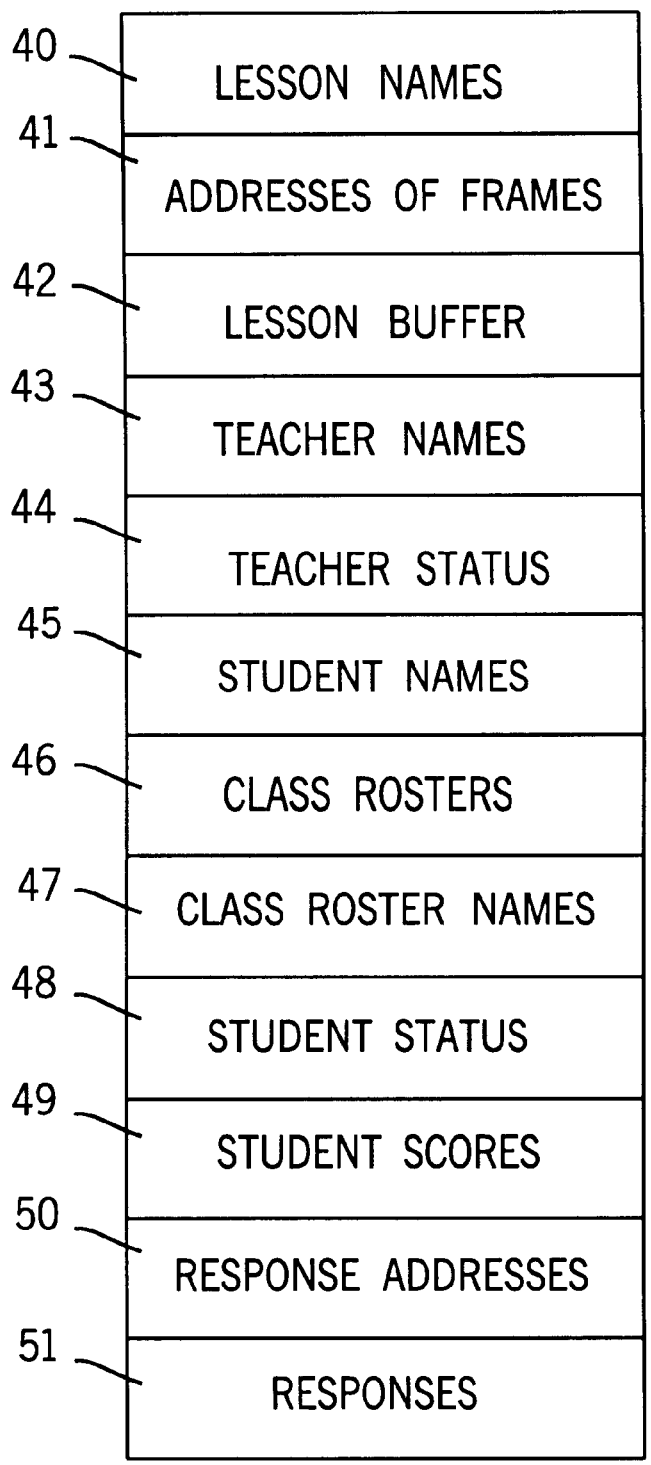
FIG. 3A is a data map, which includes the lesson data handled by the system according to the invention.
Figure 3B:
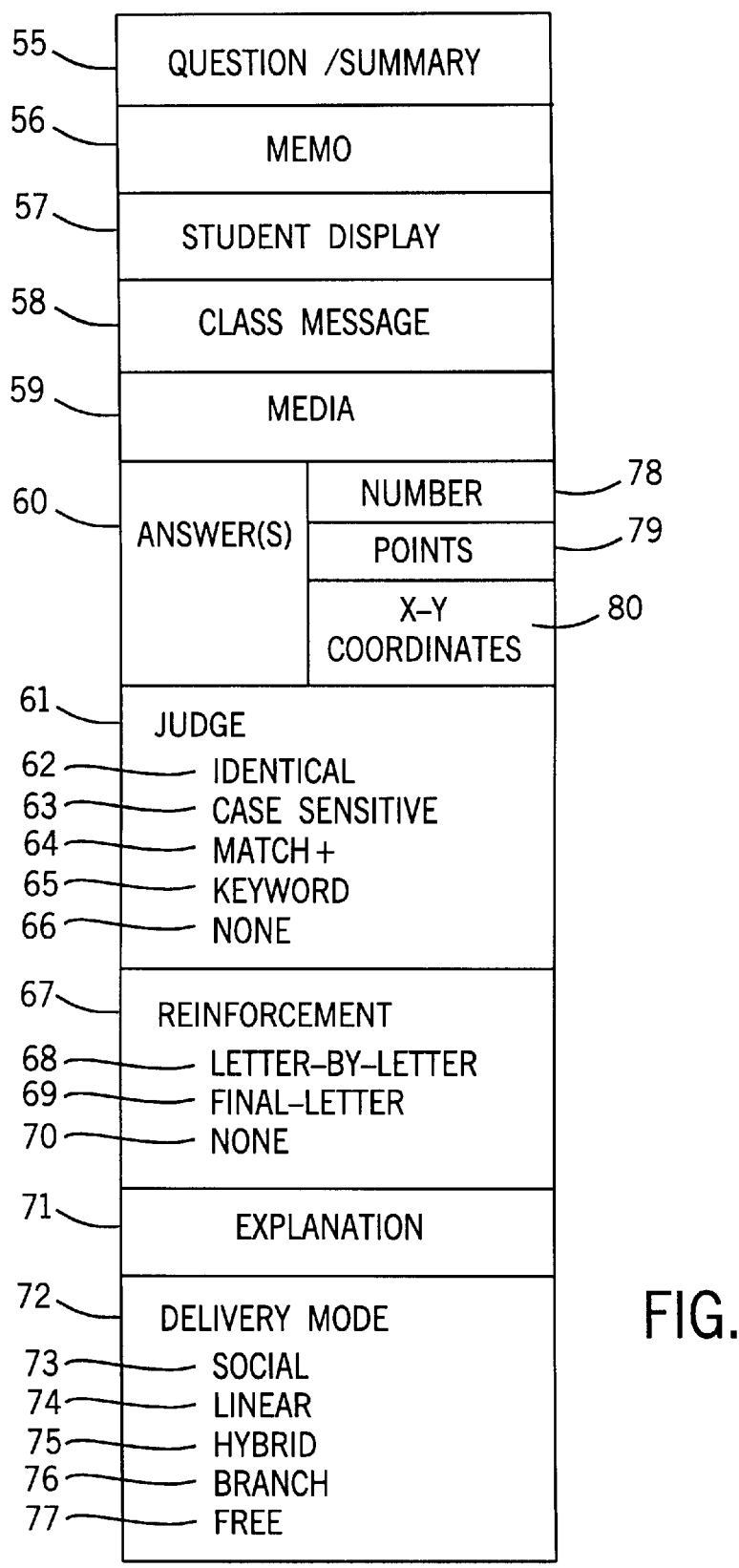
FIG. 3B lists the components of a frame object.

A "frame" is a term for an exercise, and all data elements associated with that exercise which are sent to the student computers 9 or to the class display 5, and further including at least one question, answers to the question, evaluation criteria and other elements in the frame object which is illustrated in FIG. 3B.

A "class" is a list of students, plus at least one teacher, which can be used for delivery of a lesson.

An "active lesson" combines the lesson template with a class and all student responses generated during the active lesson.

"Data" is encapsulated within "Objects" along with the program logic that operates with, or on, that data.

FIG. 3A shows elements 40, 41 and 42 which are part of the "Lesson Template Object." Elements 43–48 are data and logic related to a "Class Object." Elements 49–51 are data and logic related to an "Active Lesson Object."

FIG. 3B illustrates the data and logic for a "Frame Object." A Lesson Template Object contains references to one or more Frame Objects.

The list of students who register for a particular course and are subsequently assigned to a particular teacher will be referred to as a class roster. The teacher and students on a class roster constitute a class. It should be understood that a student's name is usually cross referenced to the student's password and in some cases also to a unique Log-on ID. Similarly, each teacher is usually allocated a password and a unique Log-on ID. Therefore, when speaking of the validation of a name, and/or password, implies here validation of the Log-on ID, if any. The students' and teachers' names are maintained in the database server 7, using a stand-alone administrative program and are cross-referenced with Log-on ID's and passwords.

In the multi-teacher system of FIG. 2, various items of data are stored in memory areas referred to as buffers, which are dynamically allocated when the object-oriented program is executed. A list of teacher names is stored in a Teacher Names buffer 43 (in FIG. 3A) in the response server 6. The list is the list of teachers currently teaching, out of the list of all the teachers in a corresponding list on the database server 7. Similarly, when a student from the whole list of student names and from a particular class roster on the database server 7, logs on, corresponding lists of student names are stored in Student Names buffer 45 (in FIG. 3A) and class rosters are created on the response server 6. Each class roster has a name, which may correspond to the name of a course for which the students in the roster have registered. A list of names of class rosters is stored in the Class Roster Names buffer 47 for rapid location of a particular class roster by the teacher.

In an alternative system the list of student names may be replaced, or have in addition, a computer address list comprising the addresses of the computers used by the students. The addresses may be the IP addresses of the TCP/IP protocol or Ethernet Card addresses or other computer identifiers.

Each of the currently active teachers, may open one or more existing lessons using the Open command under the Files pull-down menu (FIG. 5), by taking each lesson from database server 7, and placing it in the Lessons buffer 42 (FIG. 3A). Opening a lesson makes it available for modification by the teacher and for access by students, or the teacher may be required, in addition to selecting the Open command, to press an additional Unlock key (not shown), before a lesson can be accessed by students.

For ease of retrieval a list of lesson names 40 is kept for each teacher, containing the names of all the currently open lessons in response server 6, out of the total list of lessons in the database server 7. This list of open lessons 42 is grouped under the name of each teacher, from the list of teachers 43, who opened the lesson. Thus, when a student from a particular class roster logs on, the choice of lessons the student can attempt, by using a button labeled Lessons (button 163 in FIG. 9) on the screen 11 of the student computer 9 or 21, is limited to the lessons grouped under the name of the teacher associated with this class roster. The addresses 41 of each frame of each lesson are also kept in the response server 6 and the database server 7, respectively.

The teacher status 44 on the response server 6, indicates the lesson and frame number to which the teacher is currently addressed; pointers to messages displayed on the class display 5, and the current action of each teacher, such as whether the teacher is busy authoring content, or is causing students to respond in Social Mode or is observing student responses.

The student status 48, records the lesson and frame number to which the student is currently addressed and whether the student is on the way to a correct response, if the question in the frame that the student is currently responding to has a programmed correct answer.

As an alternative to opening a lesson, a single frame may be created spontaneously by means of the frame content authoring program in the main application program 4 or 34 of FIGS. 1 and 2 in the teacher's computer 1, and placing it in lesson buffer 42 of FIG. 3A.

If a session is interrupted for resumption at another time, the current relevant data, including responses on the response server 6 for a particular lesson, data from the teacher status buffer 44 and the student status buffer 48, is transferred to the database server 7 enabling the resumption of the lesson at a future time, at the exact point where it was interrupted. For ease of retrieval, the response data 51 and addresses 50 for the response data 51 are stored in corresponding buffers 50, 51, represented in FIG. 3A, for each student, for each lesson and for each frame.

When students respond on their keyboards 10, their responses are sent character by character in real time to the responses buffer 51 on response server 6, so that the teacher can observe, virtually character by character, on the monitor 3, a teacher's class response window (FIG. 14) showing a large number of students responding simultaneously. The responses appear color-coded, such as green if the student is on the correct track, red for wrong and blue if a response is the result of a question which does not have a programmed correct answer or the keyword has not yet been typed in a Keyword exercise explained with reference to FIG. 4. The response window screen display is described in greater detail with reference to FIG. 14. Such 'color-coded' responses, which are distinguished one from the other according to effect of the comparison and evaluation logic described with reference to FIG. 4, include the idea of a change of fonts like italic and bold.

The student scores for each answer are stored in a Student Scores buffer 49 in FIG. 3A. The scores are derived with the help of the same comparison and evaluation logic of FIG. 4, and so is the information in the "OK" and "Try" columns of FIG. 14. The data in the Student Scores buffer 49 is the source for the derivation of various types of reports on individual student performance and on class performance.

Each frame of a lesson stored in lesson buffer 42 in FIG. 3A has several data components. The data components of a frame are stored in memory aeas or buffers as represented in FIG. 3B. Some of the components are typically in the form of text (55 and 56); some are typically in the form of names of files with graphics content or addresses related to A-V devices (59) and some of the components are in the form of mode control data codes which determine the mode in which the frame is delivered, used, evaluated and reinforced (61–77).

The Question/Summary data is stored in Question/Summary memory area 55 and is the component which ultimately appears in printed reports on student performance, and is a summary of the question, if the question itself is too voluminous to print out. The Memo data is stored in Memo memory area 56, and is a reminder to the teacher for personal action to facilitate teaching, such as "rearrange the class seating". The Student Display data is stored in memory area 57, and is the question or message which is to appear on the student screen 11. The Class Message is stored in memory area 58, and is the question or message, if any, which is to appear on the class display 5. A media prompt is stored in the memory area 59 labeled "Media" in FIG. 3B. The media prompt is the instruction for automatic playing of media devices, e.g., 245–679 means play the section 245–679 on the disk player. Answers which are the single or multiple correct answers to a question are stored in Answer(s) memory area 60. Associated with the answers is a number of responses required for a particular frame, and this number is stored in the Number area 78. Points are awarded for each correct response and the values for the points are stored in a Points memory area 79 associated with the frame. The X-Y coordinates of the blank spaces into which the answers in some exercise types, like fill-in-the-blanks, must fit, are stored in area 80.

Mode control data is stored in areas 61–77 associated with each frame to determine modes of operation within the frame. This data is defined as follows.

The Judge Mode group 61 is a class of modes that determines how student responses are to be judged and evaluated. The Judge Modes includes the Identical Mode 62 which requires a case insensitive, perfect match between the characters of a student response and those of an answer 60. It also includes a Case Sensitive Mode 63, which requires that any matching must be case sensitive. It also includes a Match+ Mode 64, which requires matching only of the first part of a response. It also includes a Keyword Mode 65 which requires the presence of a particular string within a longer string of characters. And finally, it includes a None Mode 66, which requires no matching to take place.

This is followed by mode control data designating various Learning Reinforcement Modes, labeled Reinforcement 67 in FIG. 3B. These modes include Letter-by-letter with mode control data stored in memory area 68, implying a reinforcement feedback signal on every correct character typed by the student, with a different signal on the last character of a correct response. A Final-letter Reinforcement mode (with mode control data stored in memory area 69) implies a particular reinforcement feedback signal on the last character of a correct response only. A None mode (with mode control data stored in memory area 70) signals none of the above modes are active.

The Explanation mode is a mode when students must supply an explanation along with their answer in order for their answer to be judged and scored. This mode is controlled by mode control data stored in memory area 71.

The Delivery Mode group 72 is a class of modes that determines how the frame is delivered to the student. These modes include the Social Mode with mode control data stored in memory area 73. In the Social Mode a frame can only be presented to the student by the teacher. The Self-paced Linear Mode is controlled by data stored in memory area 74. In contrast to the Social Mode, in the Self-paced Linear Mode, the frame can be reached by the student in any order and in any manner, including by the frame number, without the help of the teacher. The Hybrid Mode is controlled by the data stored in memory area 75 and applies to a lesson including frames from both the Social Mode and the Self-pace Mode. The Hybrid Mode allows the student to reach the present frame only by using the Next Frame or Previous Frame buttons 160, 161 (FIG. 9) on the screen, implying that the student cannot reach a frame beyond the previous or the next Social Mode frame 73. The Branch Mode is controlled by data stored in memory area 76. In the Branch Mode, each answer within a frame has an associated frame number attached, which is the frame to which a student is automatically directed after giving a response which matches one of the answers in the present frame. The Free Mode is controlled by data stored in memory area 77. In the Free Mode 77, the teacher will decide at the time of teaching whether Social 73 or Self-paced Linear 74 will be used, by the state of activation of the Social button 103 operated in conjunction with the screen displays for the user interface as described in FIG. 5. Note that although Linear and Branch are both executed at a pace dictated by the student, and therefore imply "self-paced", the term Self-paced is usually used in the same sense as Linear.

Figure 4A:
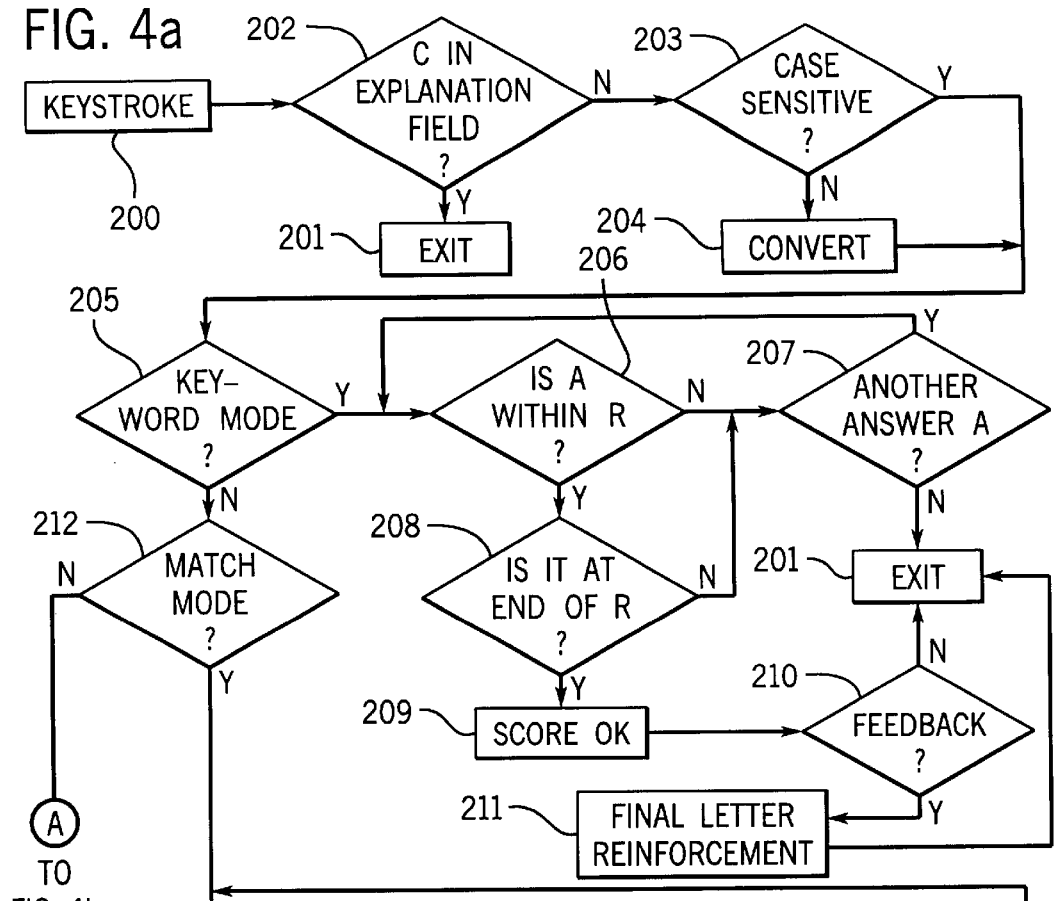
FIG. 4A is a flow chart of the comparison and evaluation logic.
Figure 4A:
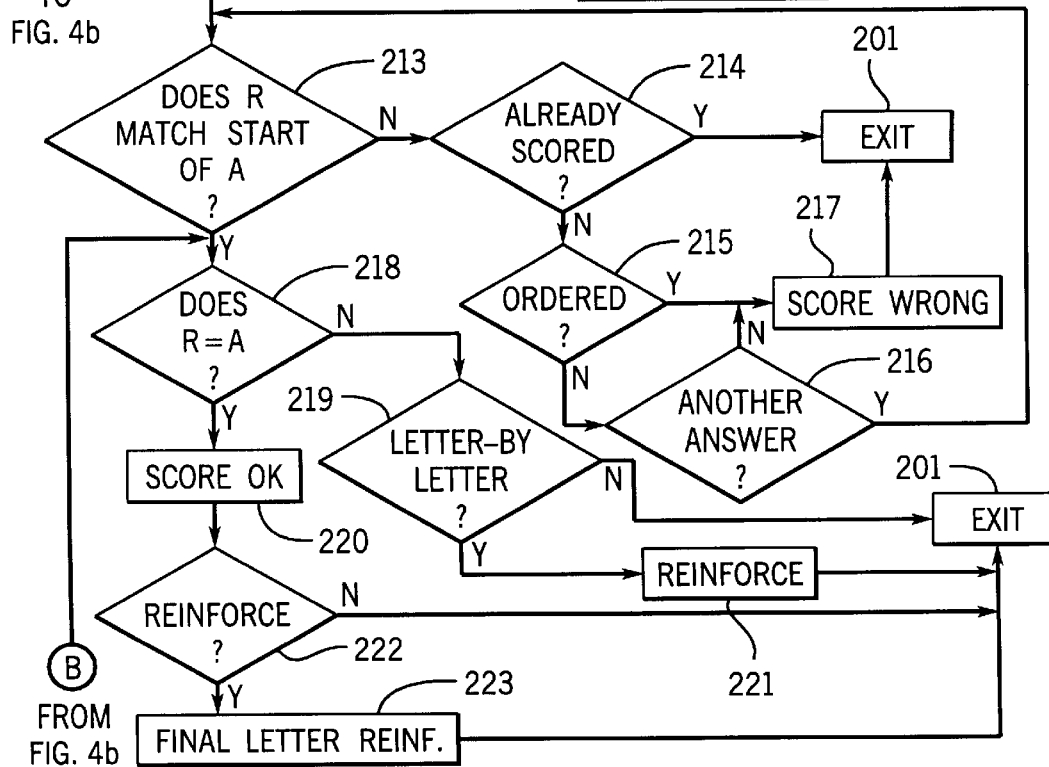
Figure 4B:
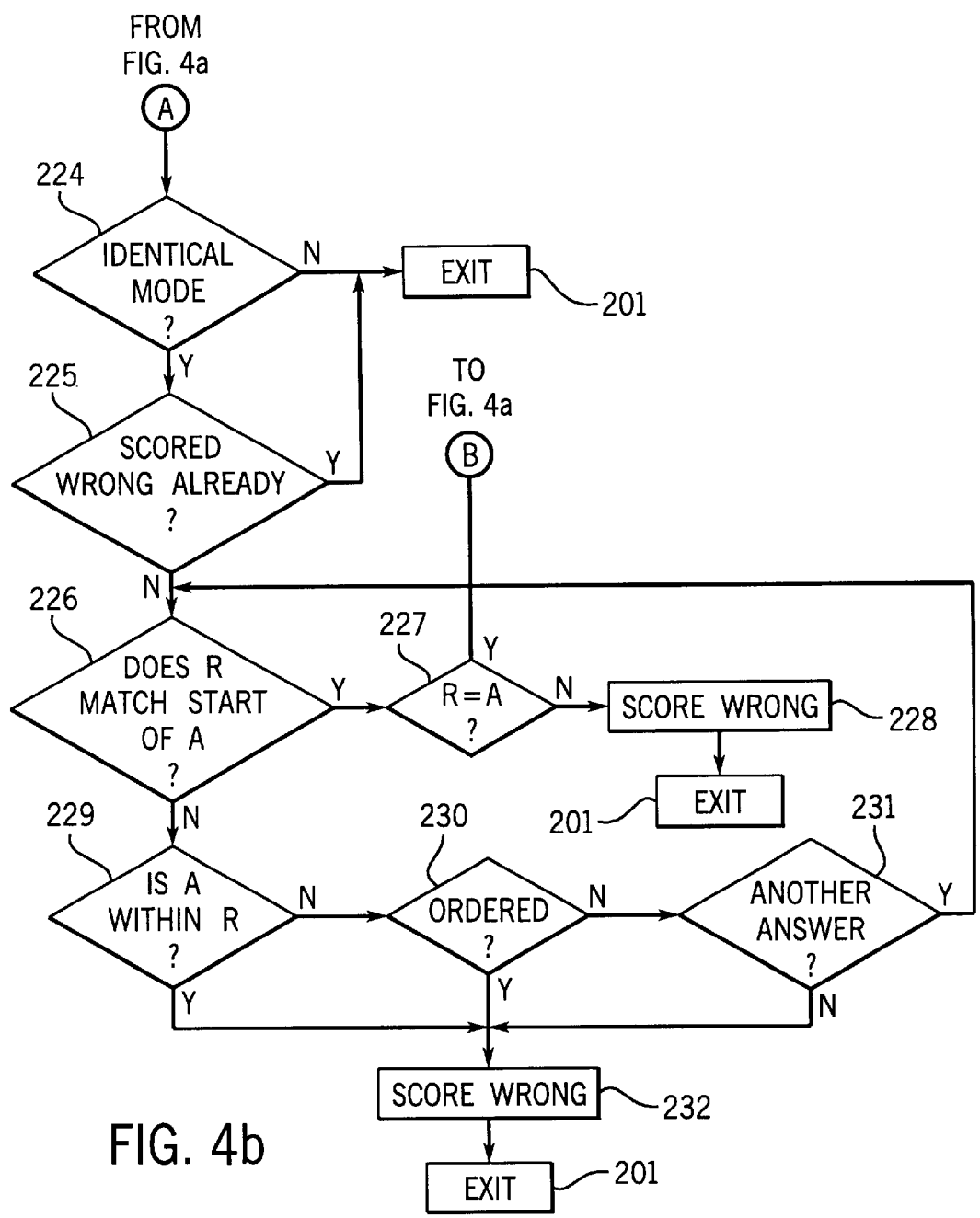
FIG. 4B is a continuation of FIG. 4A.

FIGS. 4A and FIG. 4B illustrate a flow chart which shows a version of the comparison and evaluation logic, which is stored in memory and executed by one of the computers 1, 9 in the system. This routine is started when a student makes a keystroke, as represented by input block 200, and enters a character, to be referred to as the current character C, of a multi-character current student response, R. If there is a teacher-authored multi-character answer, it is designated A. Wherever an Exit block 201 is illustrated, it means that the current character C, is ready to be sent to the Responses buffer 51 in FIG. 3A. If applicable, it is sent together with correctness data, in the form of a score, and with the co-ordinates of where it is appears on the student's screen, 11, so that it appears in the proper colors and column on the teacher's class response window shown in FIG. 14.

As represented by decision block 202 in FIG. 4A, program instructions are executed to test for a result, and if the character C is being written in the Explanation work area, as represented by the "YES" (Y) result from block 202, the comparison and evaluation logic is ignored by immediately going to the Exit block 201. If the result from executing block 202 is "NO" (N), then the program proceeds to the next block 203. There, program instructions are executed to test for the Case Sensitivity Mode. If the result is "NO", the program proceeds to a process block 204 to convert the student response R and the teacher's answer A to the same case. After this is done, or if the result from decision block 203 is "YES", the program proceeds to decision block 205, where instructions are executed to test for the Keyword exercise type.

If this mode is present, the program proceeds to decision block 206 to test whether the answer string A can be found anywhere within the responses string R. If it cannot be found, it examines the next authored answer A, as represented by decision block 207. If the result from executing block 207 is "YES", the program loops back to again execute block 206. If the result of executing block 207 is "NO", the comparison and evaluation logic is exited, as represented by Exit block 201.

If the result from decision block 206 is "YES", the program proceeds to decision block 208 to examine whether a response has been completed correctly, in which case the correct score is allocated by executing instructions represented by process block 209. If the result from executing block 208 is "NO", the program proceeds to test for another possible answer by executing block 207.

When a correct answer has been scored, the feedback mode is checked by executing instructions represented by decision block 210. If the result here is "YES", the mode is Final Letter Reinforcement for this type of exercise. If the result is "NO", the routine has been completed, and the program proceeds to the Exit block 201.

Returning to decision block 205, if the result of testing for the Keyword Mode is "NO", the program proceeds to execute instructions represented by decision block 212 to test for the Match+ Mode, in which the start of the student response R must match the start of the teacher's answer A. Assuming the result from executing decision block 212 is "YES", the program proceeds to test for this event, as represented by decision block 213. If this result is "YES", a test is made, as represented by decision block 218, to determine if indeed R=A, and if so scoring occurs through execution of process block 220, and Final Letter Reinforcement is given by executing blocks 222 and 223, if the authored frame demands it (tested through decision block 222). If string of response R is less that of answer A ("NO" result from decision block 218), a check will be made for Letter-by-Letter Reinforcement Mode (block 219), and if the control data is set, the reinforcement will be signaled by execution of process block 221.

If the result from block 213 is "NO", the program proceeds to test whether the answer has already been scored (block 214), whether the mode is Ordered (block 215), and whether there is another answer (block 216). If the answer has already been scored, the routine is exited through Exit block 201. If the Ordered mode is in effect, the answer is wrong.

When the student presses the Tab key to go to the next Response, if required, one first examines the Ordered block to see that the response is being compared with the proper Answer string. Thus, if it is Ordered, and if it is the first response R, but there was no match with the first authored Answer, then no further comparison is made with other Answers and the response is scored wrong. Scoring is shown in the blocks marked Score OK (block 220) and Score Wrong (block 217).

Referring to FIG. 4B, where the Match+ Mode is not detected in executing decision block 212, the program proceeds to execute a decision block of instructions 224 to test for the Identical Mode. If not, the routine is exited through Exit block 201. Assuming the Identical Mode is detected, instructions represented by decision block 225 are executed to see if the answer is right or wrong thus far. A wrong answer causes an exit through Exit block 201. If the answer is not yet judged wrong, the same type of checks are made in blocks 226, 227, 228, 229, 230, 231, 232, as described above for the Match+ Mode.

Figure 5:
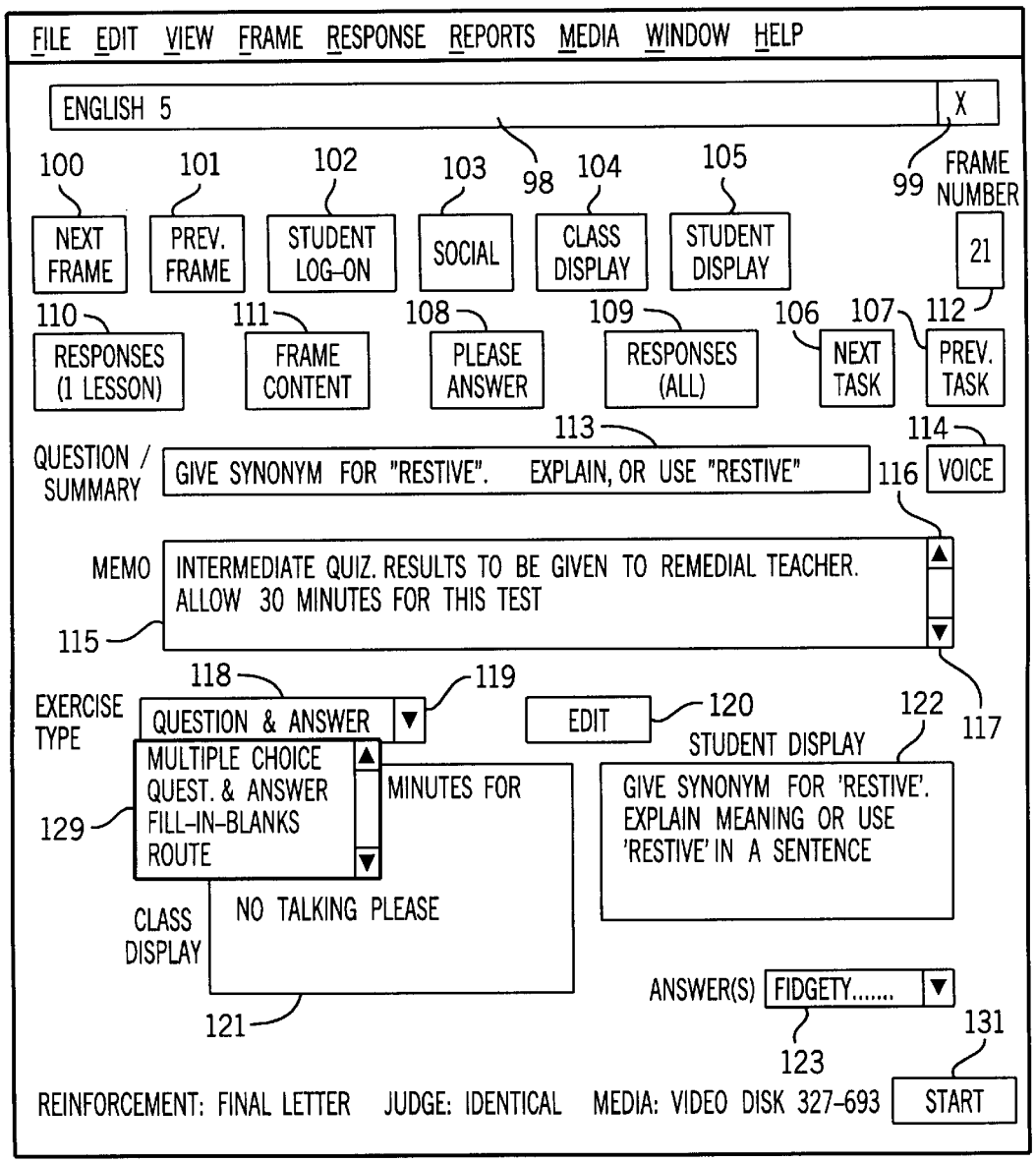
FIG. 5 is a schematic showing a general layout of the frame content user interface.

FIG. 5 shows a layout of a generalized window which is displayed on the screen of the teacher's monitor 3. This is referred to as a Frame Content User Interface (UI). It is referred to as the Frame Content UI because most of the Frame components listed in FIG. 3B are displayed in FIG. 5. The Question/Summary data is displayed as text in message box 113, Memo data as text in message box 115, Student Display data, usually as text in message box 122, Class Display data, often as text in message box 121, and the first of the answers, which in the example shown is "fidgety" in the Answers message box 123. Other frame components in FIG. 3B, such as Reinforcement Feedback 67, Judge 61 and Media 59 are shown with selected options at the bottom of FIG. 5. Pressing the Start button 131 will play the Media shown, i.e. Video Disk from 327 to 693.

Near the top of FIG. 5, in field 98 (in what is known as the "Title Bar" of a Windows 98 program), is shown the name of the current lesson being used, which is "English 5". The "X" in field 99 is the Close Button for closing the window. When the underlying Operating System is Microsoft Windows, there are standard controls available such as Maximize and Minimize, etc. These are not shown in FIG. 5 or on some other figures, since they are not considered to be essential to an understanding of the present invention.

Above the Title Bar 98 is a menu bar with pull-down menus. The first pull-down menu, Files, has commands for Opening, Saving, and Deleting lessons. If more than one lesson is open, the lessons appear like cascaded documents in a Windows 98 program, with the top lesson being the current lesson on which the teacher has the primary focus.

The Frame Number 112 in FIG. 5, shows the frame being currently addressed, which is shown as frame 21. The next or previous frames can be accessed by the Next Frame button 100 and Previous Frame button 101, respectively, and other frames by typing in a new frame number in block 112 and pressing Enter on the keyboard.

In one embodiment of the invention, the student Log-on button 102, enables the teacher to initialize the student log-on procedure.

Social button 103 may be activated or deactivated, either "manually" by clicking with a mouse, or automatically, depending on the Delivery Mode 72 in FIG. 3B. Thus, if the Delivery Mode 72 is the Social Mode, it will be activated, while if the Delivery Mode 72 is the Linear, Hybrid or Branch Mode, the Social Mode button will be deactivated. The automatic setting may be manually overridden in most cases. Actuating the Social button 103 in FIG. 5 places students in Social Mode for that frame, while deactivating Social button 103 places them in Self-paced Mode.

In FIG. 5, any message which appears in the Class Display block 121, whether text or graphics, can be viewed on the class display 5, by pressing the button 104. Also, any response that is selected from the Responses buffer 51 via the Responses window shown in FIG. 14, can be displayed on the class display 5. If the class display 5 is not visible at the location of a student, due to the student being placed at a remote location, the same messages can be broadcast on the student screens 11 by actuating Student Display button 105, after first actuating Class Display button 104.

Although there is a limited, on-screen, editing facility for the components shown in FIG. 5, particularly in the message display areas 113, 115, 121, and 122, actuating the Edit button 120 shows an Edit window with more space, editing facilities and additional frame components. If the Question/Summary work area 113 is not filled in by the author, the initial part of text which appears in display areas 122 or 121, are automatically placed there (in this order of priority), as can be seen by comparing the messages in 113 and 122. The buttons 116 and 117 help to scroll the Memo display area 115. The exercise Type 118, is what is known as a drop-down list box, which, with the help of the down arrow 119, shows a drop-down list 129, so that the exercise type can be selected from a menu of choices. The exercise type drop-down list shows "Multiple Choice", "Question & Answer", "Fill-in-the-blanks" and "Route". Other exercise types, such as "Open Ended", "Keyword" and "Hot Spot", can be found by scrolling with the help of the up and down arrows on the right of the drop-down list. Each of these exercise types results in a different edit window layout, when the Edit button 120 is pressed.

When Frame Content button 111 is activated, the Frame Content UI shown in FIG. 5 appears. However, when pressing either the Responses (Lesson) button 110, or Responses (All) button 109 or the Please Answer button 108, the actual responses of the students are shown as will be described.

Associated with the Question/Summary display area 113 is the Voice button 114, for voice-to-text conversion. Actuating the Voice button 114, causes sound spoken into microphone 36, to be converted to text and displayed in the Question/Summary display area 113. This is done with the help of the associated sound card in the computer within the teacher's computer 1, and the voice-to-text program, integrated into programs 4 and 34 in FIGS. 1 and 2, respectively.

The Next Task button 106 and Previous Task button 107 are similar to the Next Frame button 100 and Previous Frame button 101. But whereas the Next Frame button 100 and the Previous Frame button 101 show the Frame Content User Interface of the numerically following and preceding frames respectively, the Next Task button 106 and Previous Task button 107 execute combination operational commands that are selected at the time of saving a newly authored lesson under a Save command of the Files pull-down menu. For example, one could create a combination command such that when the teacher is teaching on, for example, frame 15 in Social Mode and activates Next Task button 106, a typical combination operational command executes the following steps in combination. The frame number skips frame 16 and goes to frame 17. The Class Display message which is programmed in frame 17 is displayed automatically. And, the Please Answer Button 108 of FIG. 5 is activated automatically, so that the students can respond without the teacher having to activate any other buttons. Thus, with a single execution of a Next Task button 106, one could advance through a Social Mode lesson, from one state of the system on one frame to any other state on any other frame.

It is desirable that as many of the commands as possible that are executed using the mouse (not shown), can also be executed through the keyboard 2 of the computer 1. FIG. 19 lists some buttons used with mouse clicks and the keyboard equivalent. Note that Enter is equivalent to 13 binary, which is represented by <13>. Accordingly, a series of mouse clicks and keystrokes can be converted into a string of characters. Thus, when pressing the Next Task button 106 and the Previous Task button 107, one effectively executes the commands represented by a string of characters.

It is known that a string of characters can be represented by a bar code. Thus, using FIG. 19, the combination operational command mentioned above, namely, "stay in Social Mode, jump to frame number 17, display the Class Display message which is programmed in frame 17 and press the Please Answer Button," is represented by S17<13>CP, and this string can be converted to a bar code. Accordingly, if a teacher is supplied with a manual for use with a lesson, authored by a professional courseware writer, the manual can have bar codes interspersed with text, so that even a teacher who is not computer literate, can deliver a Social Mode lesson, without learning the sequence of buttons for delivering a lesson or even the functions of the various buttons of the User Interface. In other words, with a single scan of a bar code, the teacher accomplishes what would otherwise require several keystrokes or clicking of a mouse.

Figure 6:
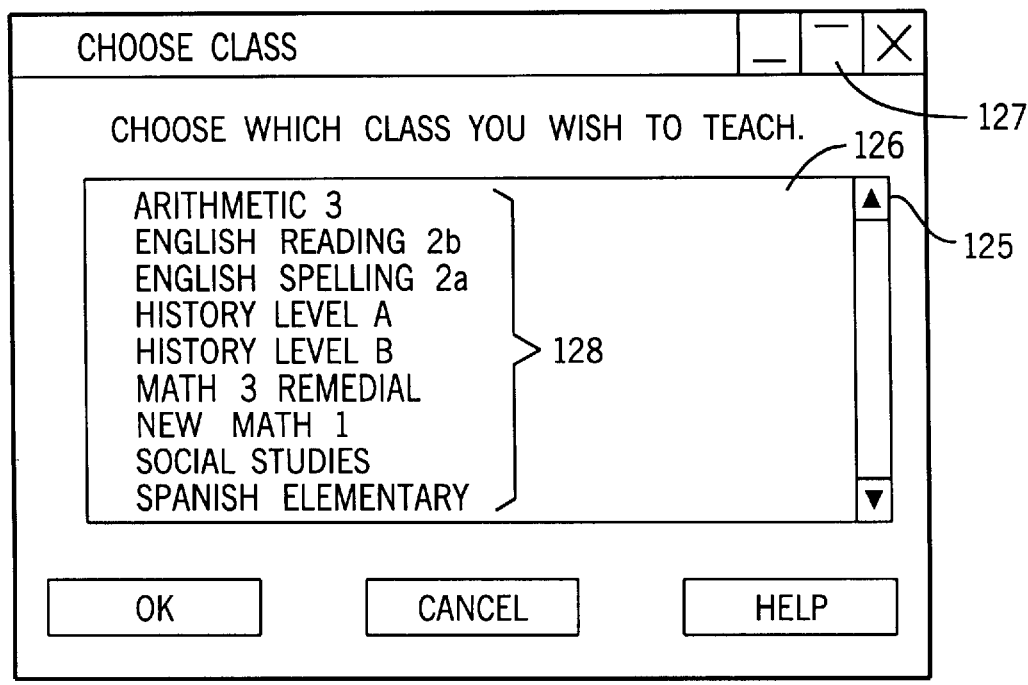
FIG. 6 shows a list box for selecting a class roster.

In order for a teacher to teach a desired group of students in the multi-teacher system shown in FIG. 2, after starting up the program, in one embodiment of the invention, the teacher presses the Student Log-on button 102, which stays activated, while the window, shown in FIG. 6, is opened.

FIG. 6 shows a Class Roster Names list 128, which is part of element 47 discussed previously in relation to FIG. 3A. Each item in the Class Roster Names list 128, is related to a class roster in buffer 46 in FIG. 3A, which comprises the names of a group of students which, together with the teacher teaching this group of students, constitutes a Class. The Class Roster Names list 128 in FIG. 6 is applicable to the name used by the teacher during the teacher's log-on. This list 128 is displayed in scroll box 126 in FIG. 6, which can be scrolled by means of scroll bar 125.

When a first teacher selects (i.e. "opens") a particular class roster from the Class Roster Names in FIG. 6, the teacher's computer 1 in FIG. 2, with the help of the response server 6 in FIG. 2, downloads a Java applet to the student browsers 33 and 35, which displays a student log-on dialog on each student screen 11. The student log-on dialog contains a Student Name data entry box 254 and a Password data entry box 255. When a student tries to log on, the student's name (or Log-on ID) is validated by the teacher's computer 1, with the help of the response server 6, against the students' names of the Class Roster selected by the teacher in FIG. 6, and if validated, the student is permitted to log-on. When a second teacher subsequently opens another class roster, only students who have not yet logged on receive a log-on dialog.

Should two teachers in different classrooms simultaneously select rosters from their respective Class Roster Names lists 128 as seen in FIG. 6, a student's name is validated against a composite of both class rosters. It is assumed that the lists have been constructed so that it is not possible for the name of the same student to appear in both class rosters selected, or else that student could join the wrong class. To solve the problem, if for some reason a student's name should appear simultaneously in two open class rosters, each computer is permanently assigned a unique address, which can be a number, either in hardware by a dip switch, or an EPROM, or in program by it being written on the hard disk, or by noting the Ethernet number of the network card, which is unique. The address can also be the IP address in an TCP/IP communication protocol, as in FIG. 2. For each computer address in the teacher's computer 1, a computer address list comprising a list of addresses of student computers in student computers 9 and 21 in FIG. 2 is drawn up, which constitutes a class to be taught by the teacher. This computer address list is analogous to the Class Roster Names list 128 in FIG. 3A, and is maintained in the database server 7 of FIG. 2. When the teacher opens a particular Class Roster from the Class Roster Names list 128 in FIG. 6, and the students attempt to log on, each student's computer address is checked against the computer address list selected by the teacher, and if there is correspondence, the student is permitted to log-on.

A teacher may now decide to teach without a pre-authored lesson or the teacher may open one or more lessons, using the Open command of the Files pull-down menu, and the students in the teacher's class, both locally and remote, can now use a Lessons button 163 on their screens, to select the lesson desired, out of a menu of all the lessons opened by the teacher, as described with reference to FIGS. 9 or 11. After executing the Open command, the teacher may be required to press an Unlock button, not shown, before the students have access to the lessons menu.

A disadvantage of the use of computer address lists, is that if students use portable computers and move from classroom to classroom with each lesson, the computer address lists would have to be modified with every lesson, which is impractical. To meet this situation, a different log-on procedure can be used where the teacher's Log-on dialog is modified so that the teacher enters not only his or her name (and Log-on ID and password), but also a code, which is referred to here as a "Location Address", and which may most conveniently be the room number where teaching is to take place, for example, "217". Similarly, each student, whether remotely located or in the same classroom, enters, in addition to his or her name and password, a location address on log-on. The student is enabled to join the class only if a student's location address is validated against the teacher's location address. This method, therefore, lends itself to spontaneous changes in location, student rosters and teachers, which is ideal for the flexible situations often prevailing in schools.

There is an advantage if a student's seat number is shown together with the student's name, when student responses are viewed on the teacher's screen. To meet this situation, particularly if the computers are portable, the student's log-on dialog may be further modified as shown in FIG. 7.

Figure 7:
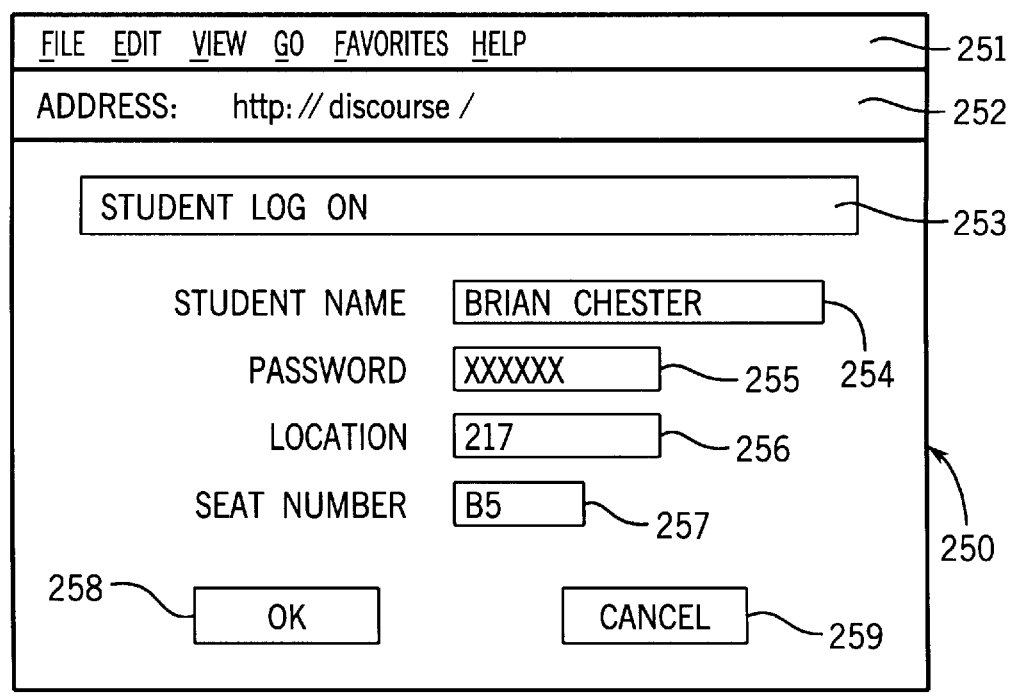
FIG. 7 shows a student's log-on dialog box.

FIG. 7 shows one form of a student's log-on dialog, useful for portable computers. The student enters his or her name, password, location address and seat number in corresponding data entry boxes 254–257. In principle, the student name and password, which in FIG. 7 is shown as if it is secret, is here required for record keeping and reports only. Validation of a student's right and ability to be a participant in a particular teacher's class, is made only against the location address entered by the teacher, at the time when the teacher logged on. Thus, a new student can, without a password attend a class, or a substitute teacher can teach, as so often happens in an actual school, without first having to modify a class roster list, and with the additional advantage that a student can at any time initiate a log-on procedure, using the student browser, without the teacher having to press a Student Log-on button 102, in FIG. 5. This system does not exclude the possibility of the additional use of a class roster names list as is done in FIG. 6, and additional validation of a student's name, for reasons other than logon.

The seat number that the student enters in data entry box 257 in FIG. 7, is obtained by the student either from marked seating places, if seating places are permanently fixed, or from a conceptual X-Y matrix created by two walls at right angles to each other, one of which is marked horizontally with the alphabet from, say, A to J, and the other with numbers, 1 to 10 respectively. The student estimates his or her seat number, e.g. B5, within the matrix. Remote students enter R1, R2, etc. Note that an error in seat number is not critical to the system, but it does help a teacher to identify students.

Near the top of FIG. 7 is shown the URL (Universal Resource Locator) address entry box 252, which is the address used at the student computer when a student communicates via a browser, as in FIG. 2. In practice, the browser is preset for each student under a Bookmark or Favorites command in the pull-down menus, so that the URL need not be remembered by the student. This aspect is considered part of the operating system per se which is not part of the invention. Thus, the URL address entry box 252 and the pull-down menu bar 251 could be hidden.

Figure 8:
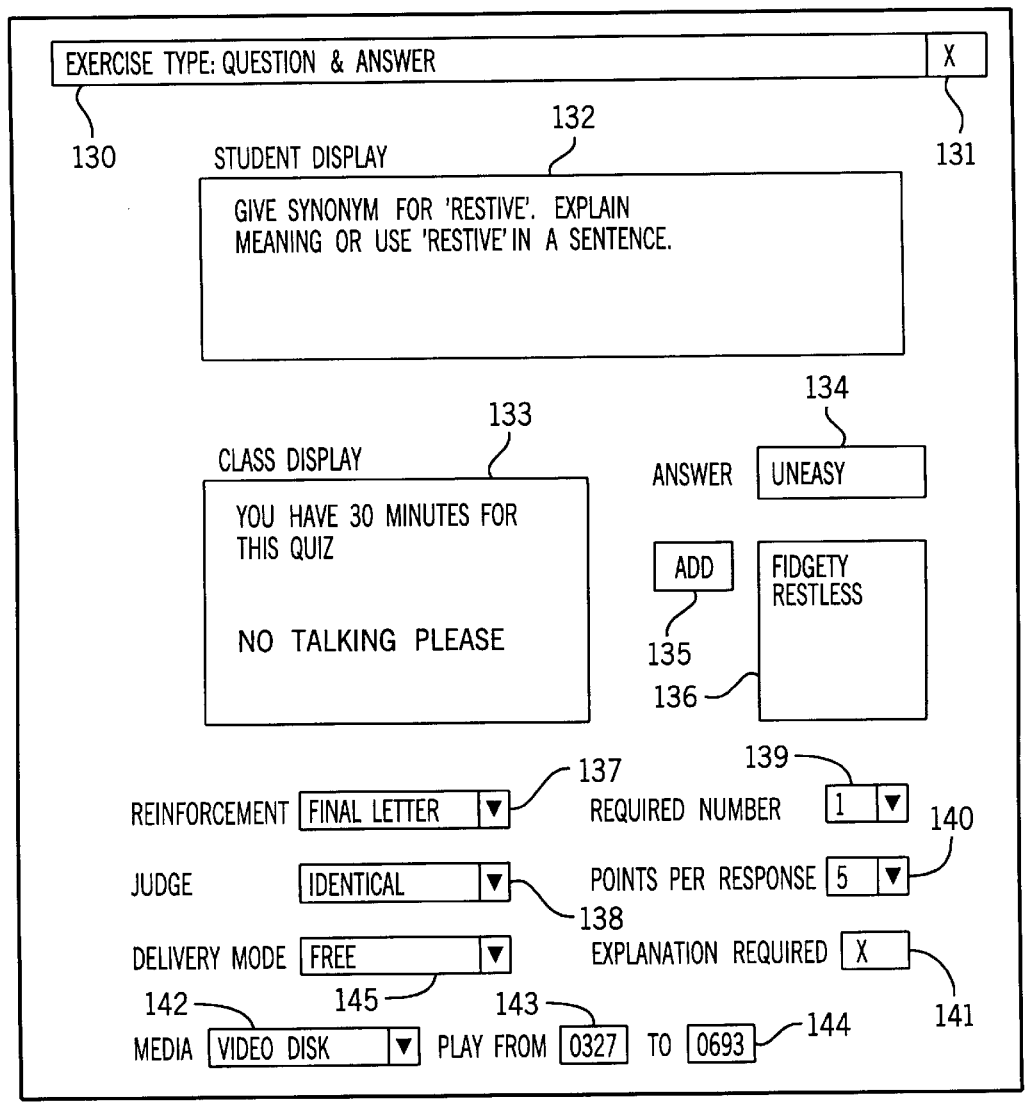
FIG. 8 shows a teacher's edit window for a question & answer exercise type.

FIG. 8 shows the teacher's edit window when the Edit button 120 in FIG. 5 is actuated while the Question & Answer exercise type 118 has been selected from the drop-down list 129 in FIG. 5. In FIG. 8, the student display box 132 and the class display box 133 correspond to the same items 122 and 121 in FIG. 5, respectively, and contain the question, which is authored in either box. In FIG. 8, the question "Give synonym of 'Restive'. Explain meaning or use 'restive' in a sentence." is written in the Student Display area 132, while the message "You have 30 minutes for this quiz. NO TALKING PLEASE" is written in the Class Display area 133. The Answers to the question, if there are more than one, are entered in FIG. 8 by typing into data entry/display area 134 and adding it to the list of Answers 136, by actuating the Add button 135. In FIG. 8, the third alternative answer "uneasy" in 134, is about to be added to the two answers "fidgety" and "restless" in 136.

In FIG. 8, drop-down list boxes 139 and 140 (with the help of the down arrows shown) help in the selection of the Number of responses 78 (in FIG. 3b) and the points per correct response 79 (in FIG. 3b), respectively. The teacher may author more answers 136 in FIG. 8, than the number of required responses 139. For example, in FIG. 8, one response is required, as shown by the number "1" in drop-down list 139, but a total of three answers are being authored in data entry area 136.

Drop-down list boxes 137, 138 and 142 in FIG. 8 are the means of defining Reinforcement Mode, Judge Modes and Media Devices in the bottom line in FIG. 5. The Reinforcement Mode drop-down list box 137 in FIG. 8, contains the items 68, 69 and 70 of FIG. 3b. The Judge Mode drop-down list box 138 in FIG. 8 contains the items 62 to 66 in FIG. 3b. The Media Device drop-down list box 142 lists media devices like video disk, VCR (video cassette recorder) and slide projector. The data entry boxes 143 and 144 receive numbers entered by typing to indicate what section of the medium must be played.

The Delivery drop-down list box 145 in FIG. 8 contains the items 73 to 75 and 77 in FIG. 3b. (Branch Mode 176 implies a different exercise type from that shown in FIG. 8.)

If the Explanation check box 141 in FIG. 8 is checked by clicking with the mouse, then the student is required not only to give a response that matches the answers as designated in 136 (and 134), but the student must also give an explanation of the reasoning for the student's response. This creates an extra work area on the Student screen 11 of FIGS. 1 or 2 as shown in FIG. 9.

Figure 9:
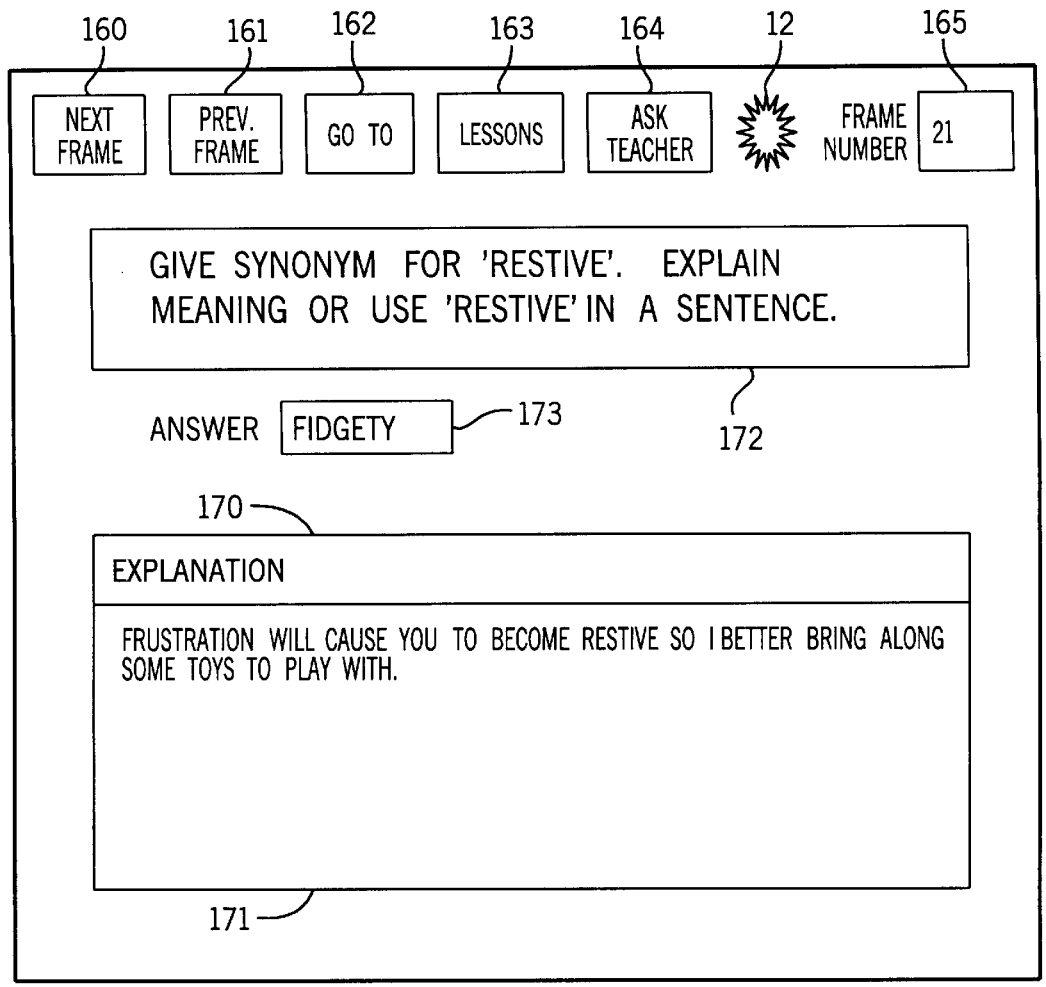
FIG. 9 shows the student screen for a question & answer type frame.

FIG. 9 shows the student screen 11 on Student computers 9 or 21 for a Question & Answer type frame, that also requires an Explanation, as a result of checking Check box 141 in FIG. 8. The necessity of buttons 160, 161 and 162 and box 165 in FIG. 9 depend largely on Delivery Mode 145 in FIG. 8, as will be explained.

The question which was authored into work area 132 in FIG. 8, appears near the top as illustrated in field 172 in FIG. 9. The cursor comes to rest in Answer work area 173. The student is expected to write his or her response to the question there, and the explanation in work area 171 below under Explanation 170. When the student writes his or her response, which is shown as 'fidgety' in FIG. 9, the response is compared and evaluated, character-by-character at the instant each character is written, according to the Judge 138 criterion in FIG. 8, against the three authored answers in block 136 in FIG. 8. At the same time, characters are transmitted as they are being typed to the Response Buffer 51 in FIG. 3a by means of the Response server 6 in FIG. 2. Should the student at any time click his mouse in the Explanation text entry/display area 171 in FIG. 9, the X-Y co-ordinates where clicking has occurred, are transmitted to the Response buffer 51, where the logic ensures that subsequent characters typed appear in the Explanation column of FIG. 14. At the same time, the main part of the comparison and evaluation logic of FIG. 4, for matching of the student response against the authored answer, is not used. Should the student now click outside the Explanation text entry/display area 171, the change in X-Y co-ordinates is noted, the cursor is transferred back to the text entry/display area 173, and the student may proceed to modify the response in text entry/display area 173, while comparison and evaluation of the response resumes as before.

The presence of the Next Frame button 160 and Previous Frame button 161 and the Go To button 162 and Frame Number box 165 in FIG. 9, depend on the state of the Social button 103 in FIG. 5 and the choice made, while editing, of Delivery Mode 145 in FIG. 8. This is summarized in FIG. 20 under the heading Mode, Social button, Next and Previous, and Go To + Frame Number. Thus, if the Social button 103 in FIG. 5 is activated, and the Delivery Mode 145 in FIG. 8, is Social, then none of the buttons 160, 161 or 162 or the box 165 are present in FIG. 9, since the student cannot change frames when the teacher places the student in Social Mode. An example of a student screen in Social Mode, is given in FIG. 13. In contrast, if the Social button 103 is de-actuated (for Self-paced) and the Delivery Mode 145 is Free or Linear, then the Next 160 and Previous 161 and box 165 are present as shown in FIG. 9, since this implies self-paced Linear Mode where the student can select any frame number at will. The third possibility in FIG. 20 is the Hybrid Mode. The Next Frame button 160 and Previous Frame button 161 of FIG. 9 are present, but the Go To 162, and Frame number box 165, are missing, as shown in FIG. 11. This is because the student is allowed to address at any one time a limited number of adjacent Hybrid frames located only between the previous Social Mode and the next Social Mode frames.

The Lessons button 163 in FIG. 9 presents the student with a list of lessons that the relevant teacher opened using the Open command under the Files pull-down menu.

The Ask Teacher button 164, helps the student to get the attention of the teacher, through a short message, particularly if the student is located outside the teacher's classroom. The message is merely an indication of the student's name, and possibly seat number, and not an elaborate explanation of the actual reason for calling the teacher's attention, in order not to clutter the teacher's screen with messages and thereby disturb the teacher. At a suitable time, the teacher acknowledges the student, most often verbally.

The icon 12 in FIG. 9 corresponds to the reinforcement feedback light 12 of FIGS. 1 or 2.

Figure 10:
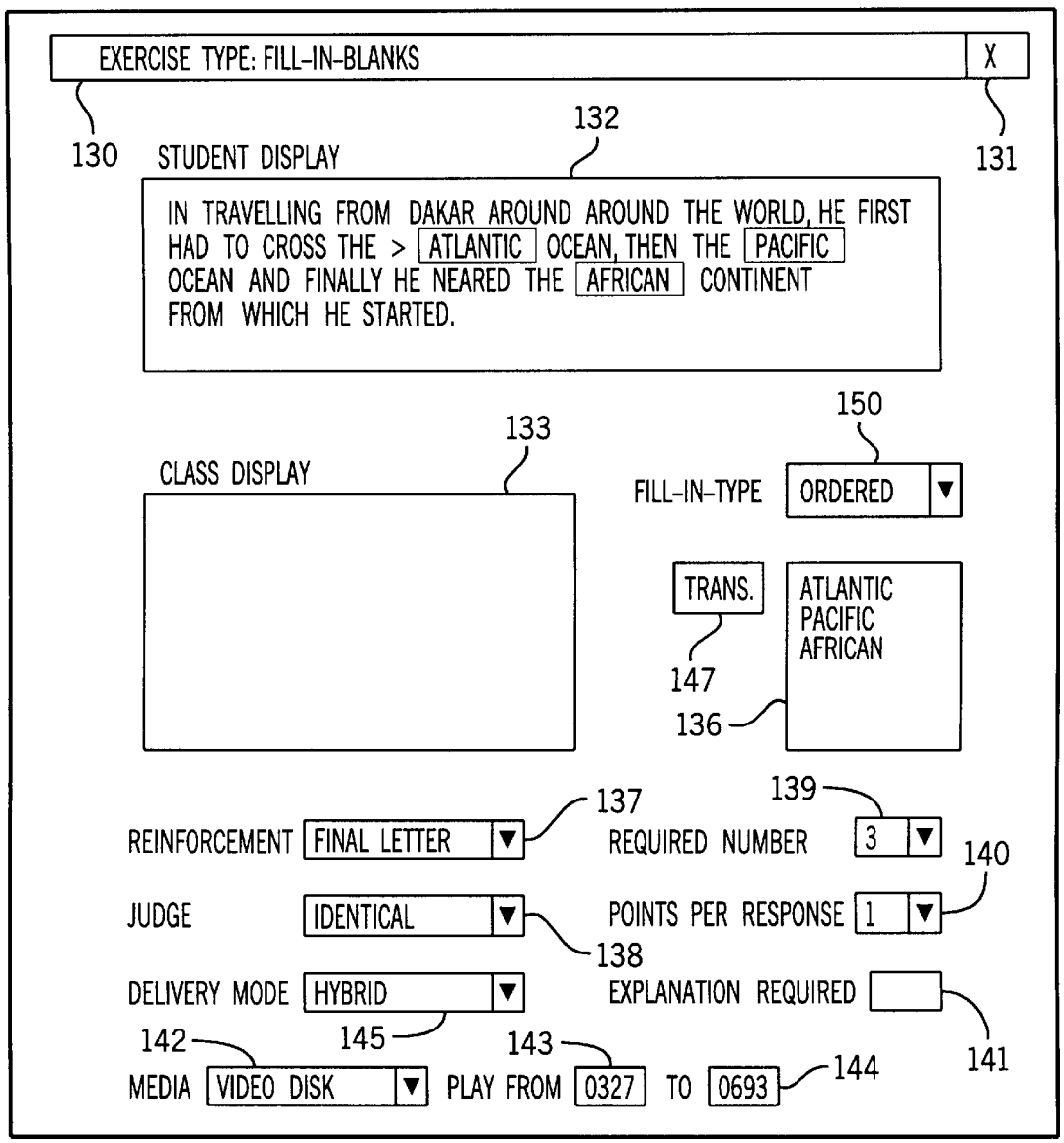
FIG. 10 shows the teacher's edit window for a fill-in-the-blanks exercise type.

FIG. 10 shows the edit window when the Fill-in-the-blanks exercise type is selected from the drop-down list 129 in FIG. 5 and the Edit button 120 is pressed. FIG. 10 resembles FIG. 8 except for the Fill-in type drop-down list box 150, which has at least two menu choices, Ordered and Unordered. When a question or statement is presented which has missing words which have to be filled in, in a specific order, the Ordered command is selected by the author, as shown in box 150. The Frame is authored by writing the question or statement, complete with the missing words filled in, as shown in the Student Display area 132. The words to be filled in here are "Atlantic, Pacific and African." Next, one "blocks" these three words by clicking on each of these three words with a mouse and dragging the mouse marker over these words. ("Blocking" of text or the highlighting of text is a known term in word processing programs.) In FIG. 10, blocking is represented by the squares drawn around the words. Finally, one presses the Transfer button 147, which completes the process. This simple action of blocking and actuating the Transfer button 147, results in several things being accomplished automatically. First, the three blocked words are stripped from the sentence and are listed in order in Answers box 136. Second, the number "3" is filled in, in the Required Number box 139. Third, the correct size gaps are left in the question or statement; and the three answers, Atlantic, Pacific and African are transmitted, together with the X-Y co-ordinates for the two ends of each gap, to the respective buffers, namely the Answers buffer 60 and the X-Y Co-ordinates buffer 80 in FIG. 3b.

The number of characters per line and the number of lines in work area 132 in FIG. 10, are exactly the same as those of the Student computer screen 11, in FIGS. 1 or 2. When the frame is sent to a student computer 9 or 21, the X-Y co-ordinates are included, so that the students responses can be logically fitted into the vacant spaces in the sentence on the student's screen 11 as seen in FIG. 11.

Figure 11:
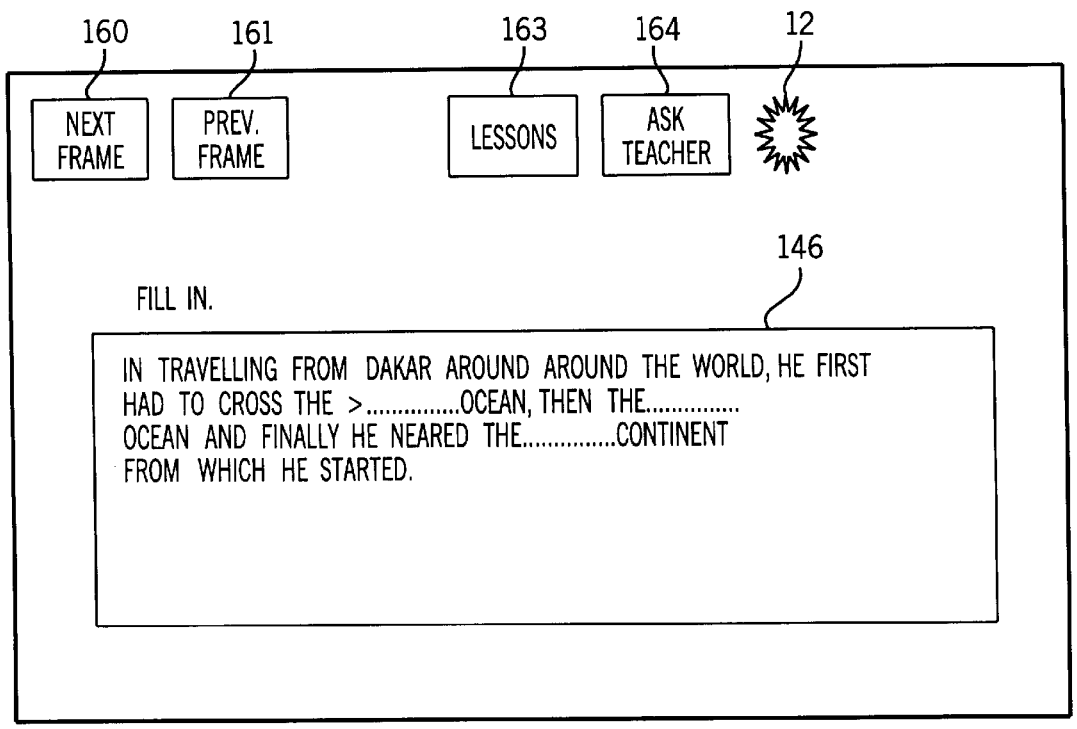
FIG. 11 is a view of a student's screen for the fill-in-the-blanks type of exercise.

FIG. 11 is a view of a student's screen for a Fill-in-the-blanks type of exercise, as described with reference to FIG. 10. The difference in the layouts of the top row of buttons in FIG. 11 and FIG. 9, is due to the fact that unlike FIG. 8, the setting of edit window in FIG. 10 shows the Delivery Mode 145 to be Hybrid, as explained with reference to FIG. 20.

The cursor initially comes to rest in the first blank space to be filled in, as shown by the ">" symbol in FIG. 11. When the student finishes fitting in the first answer in the space for Atlantic, he or she presses the tab key or clicks with the mouse on the space for Pacific and fills in the second response, etc. Each student response is compared and evaluated, character-by-character at the time of typing, with the corresponding answer according to the Judge mode specified in 138 of FIG. 10 and reinforcement is given according to the Feedback selection in 137, in FIG. 10, while using the comparison and evaluation logic of FIG. 4.

In an alternative embodiment, instead of using X-Y co-ordinates, non-printable control characters can be embodied within the question or statement at the starting and finishing points of each fill-in-the-blank space in FIG. 11, which is then used at the student computer 9 or 21 to determine where a word must be filled in.

If the Fill-in exercise type in 150 in FIG. 10 is Unordered, then the order of the responses to be filled in is not important. An example of an Unordered frame is where the question is "In the book A Tale of Two Cities, the two cities are _____ and _____."

Figure 12:
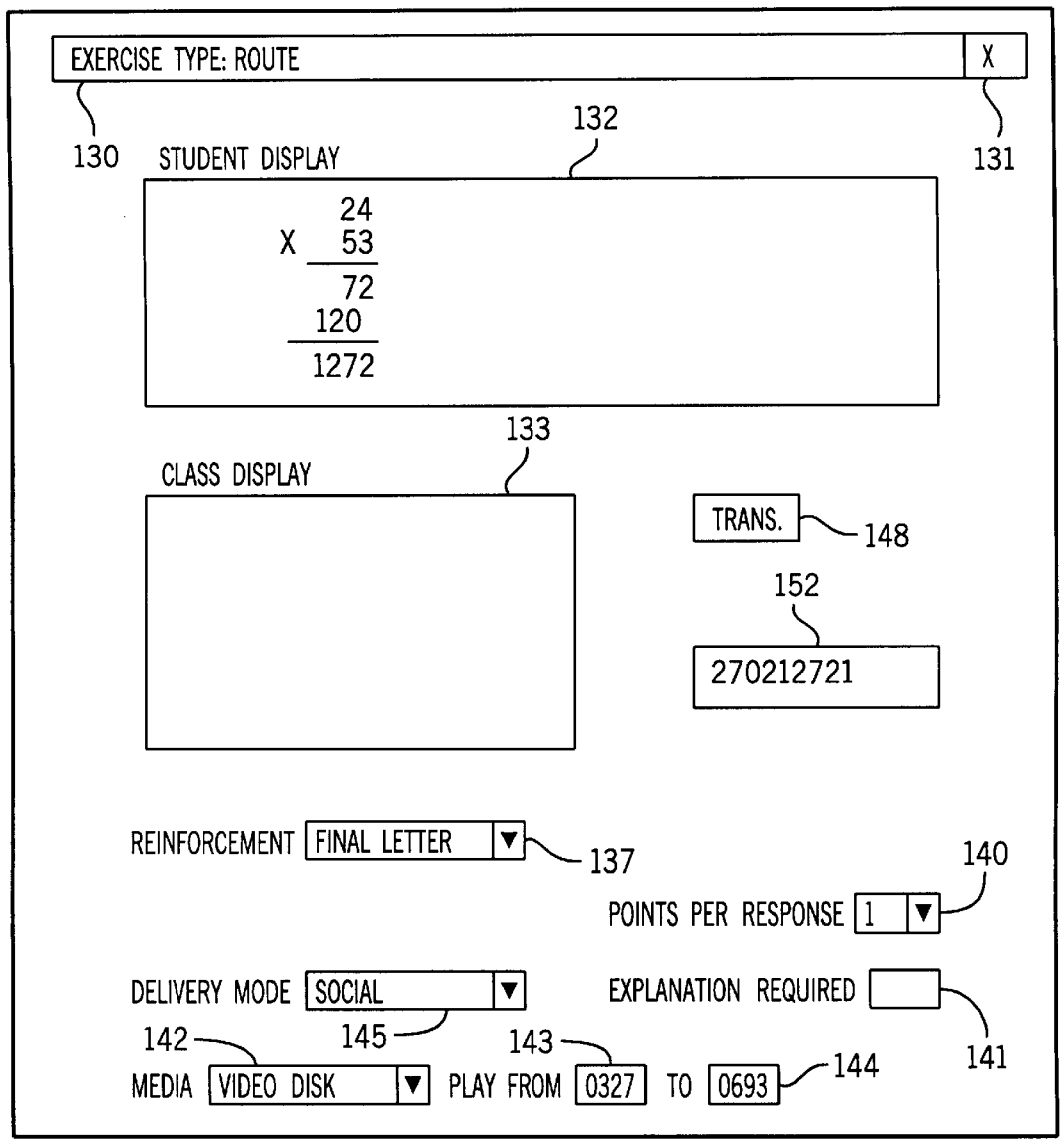
FIG. 12 shows the teacher's edit window for a route type of exercise.

FIG. 12 shows the edit window when the Route exercise type is selected from drop-down list 129 in FIG. 5, and the Edit button 120 is pressed. FIG. 12 differs from FIG. 10 in that the Required Number list box 139 in FIG. 10 has been removed, since the response is treated as a one answer string. Consequently, the box 136 in FIG. 10 has also been reduced to one line, as shown by 152 in FIG. 12. Also, the Judge mode is always Identical so the box 138 in FIG. 10 has been removed. The Route exercise shown in FIG. 12 is long multiplication of two numbers, such as "24×53". To author this type of Route frame, where the response characters of the student can appear in an order other than from left to right, one sets out the question as well as the answer, as is shown in FIG. 12. The student is expected to first type the number "72" from right to left, then "120", and finally "1272", also from right to left. For this to happen, the teacher clicks with the mouse on each character, in the order that the student is expected to enter his or her answer, thereby blocking the character as a visual aid. After every click, the Transfer button 148 is actuated, so the character gets transferred to the answer box 152, so that the number "270212721" is built up in the answer box 152. In an alternative embodiment of the invention, each character can be transferred in turn, to answer box 152 by clicking on the character, so that the number "270212721" is built up, without the use of the Transfer button 148. As the number is built up, each character clicked is sent to the answer buffer 60 in FIG. 3b together with the X-Y co-ordinates of the character clicked, to the associated X-Y Co-ordinates buffer 80. When the frame is sent to a student computer 9, the co-ordinates are included for each character, and the question is set out without the answers, as shown in FIG. 13.

Figure 13:
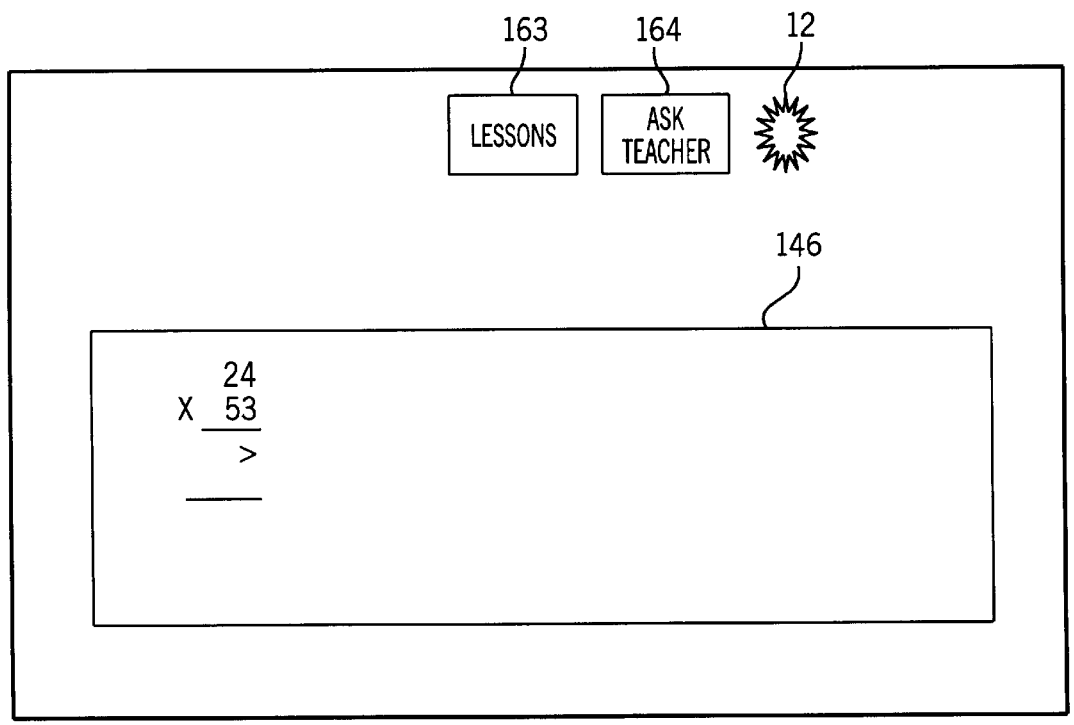
FIG. 13 is a view of a student's screen for the route type of exercise.

FIG. 13 is a view of a student's screen display for a Route type of exercise, as described with reference to FIG. 12. The difference in the layouts of the top row of buttons in FIG. 13 and FIG. 11, is due to the fact that unlike FIG. 10, the setting of Edit window in FIG. 12 shows the Delivery Mode 145 to be Social and not Hybrid, as explained with reference to FIG. 20.

In FIG. 13, the cursor comes to rest at the first X-Y co-ordinate at the position where the student is expected to type the digit "2" of the number "72". This is shown by the symbol ">" in FIG. 13. After the student types "2", the cursor moves over automatically to the next X-Y co-ordinate, in order to type the "7" and so on, until the last X-Y co-ordinate is reached. Each character that the student types is immediately compared and evaluated for a match with the answer in the Answer field 152 of FIG. 12, while using the comparison and evaluation logic of FIG. 4. The cursor moves irrespective of whether a match is found or not. The student receives reinforcement feedback on a match, according the reinforcement drop-down list box 137 in FIG. 12.

Figure 14:
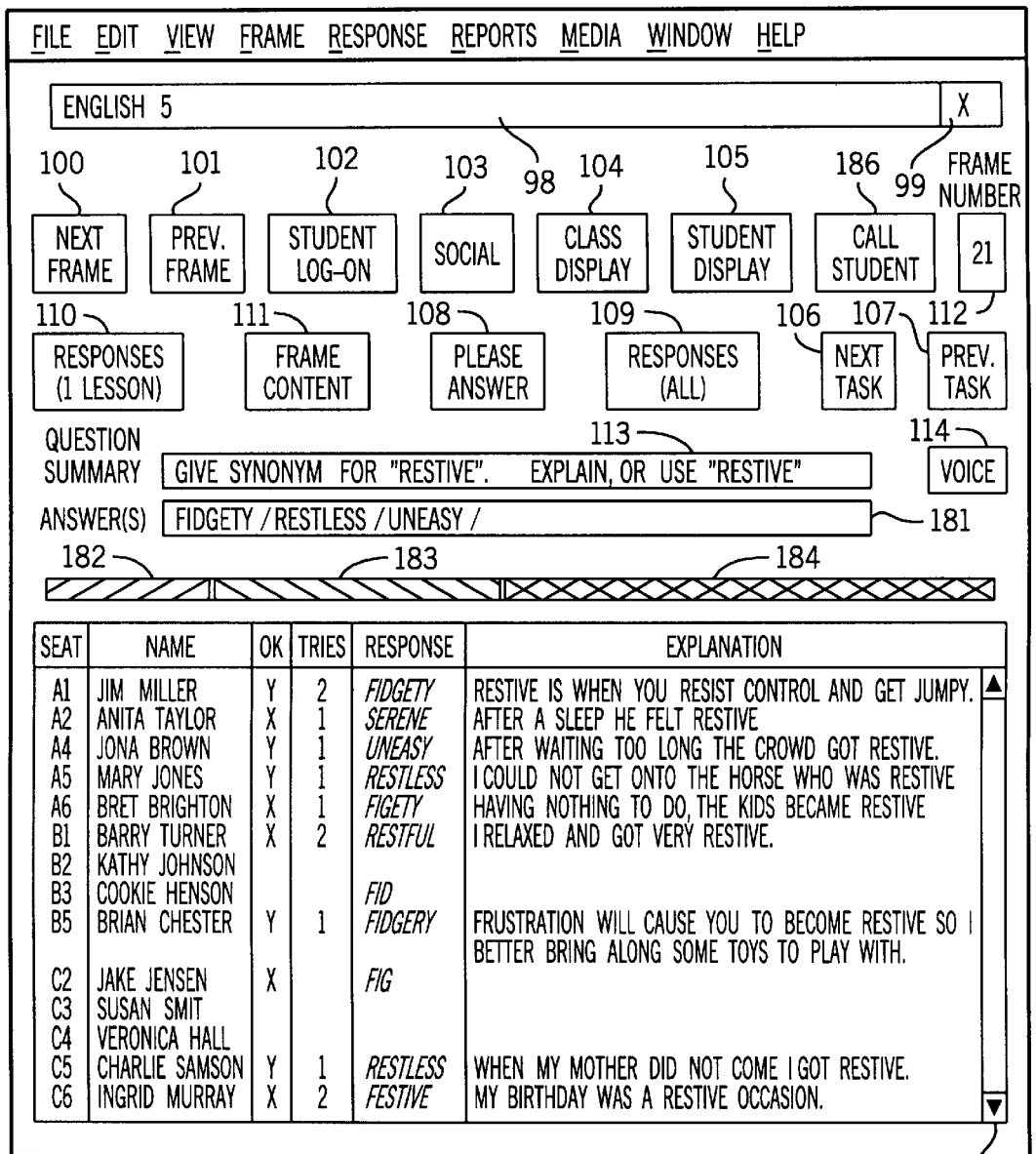
FIG. 14 shows a view of a teacher's response screen display for all of the students in a particular class for a particular lesson.

FIG. 14 is an example of the Response Screen, (also referred to as the responses view), which is the result of pressing the Response button 110 in FIG. 5, after the students have already started to respond. The screen is dynamic since it is updated while students type on their keyboards 10. The two top rows of buttons from 100 in the top left to 107 of FIG. 14, as well as the Question/Summary field 113, are virtually the same as in FIG. 5, the Frame Content User Interface. In other words, the part below the section line A-A in FIG. 14, could be attached to the bottom of FIG. 5, if the teacher monitor screen would be big enough for comfortable reading. This would then show the main User Interface of the present invention, comprising a static top section, describing the main components of the frame as in FIG. 5, and a dynamic bottom section, which shows in real time how students are responding, as in FIG. 14. On the other hand, with smaller screens, the section below A—A in FIG. 14, can be overlaid on top of FIG. 5, to appear as a Window as a result of pressing the Responses key 110. In the latter case, the additional Call Student button 186, whose use will be explained, would be grayed out in the Frame Content User Interface of FIG. 5, as it is not operative.

The teacher's class response window of FIG. 14 applies to frame 21, as can be seen in block 112, of a single lesson, as indicated by (1 lesson) on Response button 110. The name of the lesson is English 5 as shown at the top of FIGS. 5 and 14. The Question/Summary 113 and the Answer(s) 181 in FIG. 14 remind the teacher of what the authored frame is all about, while the teacher examines the dynamic screen below, as the students are responding.

In FIG. 14, the column with the heading "Seat", gives the seat numbers, while the column with the heading "Name" gives the names of the students. The scroll bar 185 may be used for seeing the responses of other students. The column with the heading "OK" shows "Y" for correct and "X" for wrong and nothing if a student is on the right path, or has not answered. This OK column may also contain a number such as "1", indicating that the teacher awarded the student one point, as will be explained with reference to FIG. 17. The column headed "Tries" indicates the number of attempts made by the student on this question, a deviation from a correct response being counted as a try. The column headed "Response" is the response of the student to the teacher's request for the direct answer to the question shown in brief in field 113. This Response column is color-coded, but for convenience is shown here as follows: italics font instead of green for correct; normal font instead of red for incorrect. If a response is the result of a question whose answer is judged according to the Keyword Mode 65 of FIG. 3b, and a student's response has not yet reached the keyword, the response would appear in bold or blue. Also, if a question does not have a programmed correct answer, the Response column would be written in bold or blue. Because the Explanation check box 141 in FIG. 8, is checked to indicate that an Explanation work area for the student is required, the Response Screen in FIG. 14 also has an Explanation column.

In FIG. 14, it is seen that Brian Chester in seat B5, who signed up as shown in FIG. 7, has responded "fidgety" as shown in FIG. 9 in data entry/display area 173. Since this student's response, matches one of the three answers in Answer(s) field 181 in FIG. 14, (which is "fidgety", "restless" or "uneasy"), the OK column for Brian Chester shows a "Y" for correct, while his response "fidgety" appears in italics, and his explanation in the form of a sentence "Frustration will cause you . . . ." appears in the Explanation column. Students in seat numbers A1, A4, A5 and C5 are in the same situation as Brian Chester in seat B5, as far as correctness is concerned, but as will be shown, their scores may be immediately modified by the teacher, if the Explanation is not acceptable to the teacher.

Note that the students in seats A2, A6, B1 C2 and C6 have been marked wrong, and the responses are not in italics, but not all for the same reason. The students in seats A2, B1, and C6, are totally wrong. The student in seat A6, has got the right word, but has misspelled fidgety. The student in Seat C2 has not yet completed his response, as is the case of the student in B3, however whereas the B3 student is on the right track of "fidgety", and hence her response is in italics, the student in seat C2 typed a "g" instead of a "d", thereby causing his response to change immediately from italics to the normal font.

Note also that students in seats B2, C3 and C4 have not responded at all and also that whereas the student in seat A1 had "2 Tries" and then got the correct response, the student in seat B1 had "2 Tries" and still did not get it correct.

The performance bars 182, 183 and 184 indicate the performance of the class on the frame being viewed by the teacher, which from the Frame Number box 112 is seen to be frame 21. Each bar is colored differently, however in FIG. 14 it is shown shaded differently, according to percentages, for a total of 100%. Performance Bar 182 is in green and indicates the percentage of the students who have given a correct response. Bar 183 is in red and indicates the percentage of the students who have given an incorrect response. Bar 184 is in blue and indicates the percentage of students who have not responded, including the students who are on the correct path, such as B3 in FIG. 14. The Seat column in FIG. 14 shows the seat numbers in alphabetical order, however by clicking with the mouse on any of the three bars 182, 183, 184, the Seat numbers, Names, Responses and associated data are rearranged. For example, clicking on the red performance bar 183, will show students with red or incorrect responses first, that is, A2, A6, B1, C2, C6, thereby drawing the teacher's attention to the difficulties being experienced. Next will come the students who have not yet answered or are on the right path, and finally the students with correct answers. Thus, the performance bars act also as sorting buttons.

There are three main types of Responses screens. The first is shown in FIG. 14 and is the result of actuating Responses (1 Lesson) button 110.

The second Response screen results from pressing the Please Answer button 108, provided the system is in Social Mode, implying that Social button 103 is actuated. The Please Answer button 108, is pressed by the teacher the instant that the teacher requests a response. Accordingly, the OK, Tries, Response and Explanation columns have no data, until the students start to respond.

The third Response screen is the result of the teacher pressing the Responses (All) button, 109. If more than one lesson is opened, with the help of the Open command of the Files pull-down menu, the teacher creates folders for each lesson, which appear cascaded one behind the other. The students, using the Lessons button 163 in FIGS. 9, 11 or 13, can now select to work on any of these open lessons. The teacher can follow what students are doing on a particular frame of a particular lesson, by clicking on the appropriate Lesson folder, and choosing the correct Frame number box 112. If, however, the teacher wants to know what a particular student is currently doing without knowing the lesson on which the student is working, pressing the Responses (All) button 109, shows the responses of all the students at the current frame of each student, and the name of the current lesson for each student. Accordingly, the Responses screen is the same as FIG. 14, except for the addition of a Frame Number column and the changing of the Explanation column to a Lesson Name column.

Clicking on a student name "blocks" the name, which in FIG. 14 is illustrated with the dotted rectangle around the name Bret Brighton at Seat A6. If necessary, more than one name may be blocked by holding down the Shift key on the keyboard while clicking on the name. After blocking a name, there are several important actions that a teacher can take with respect to this student's response. These include clicking on the Class Display button 104, thereby placing the student's response on the Public Display. The identification of a student's name when blocking it, is accomplished by noting the X-Y co-ordinates of the student name at the time it is first written in the Name column in FIG. 14. These X-Y coordinates are stored in a local screen management buffer of the teacher's computer in teacher computer 1 in FIGS. 1 or 2. When subsequently clicking on a name, the student's name can be obtained from the X-Y co-ordinates and hence the student's response from the Responses buffer 51 of FIG. 3a. Note that in the case of Brian Chester at B5 in FIG. 14, the response appears over two lines causing the data of the students below B5 to shift one down. As it is shifted down, the X-Y co-ordinates of the names that shifted are modified.

If the teacher blocks a student's name in FIG. 14 and then presses the Student Display button 105, the student's response will be broadcast to each student terminal, like a frame which is authored with a Student Display.

Figure 15:
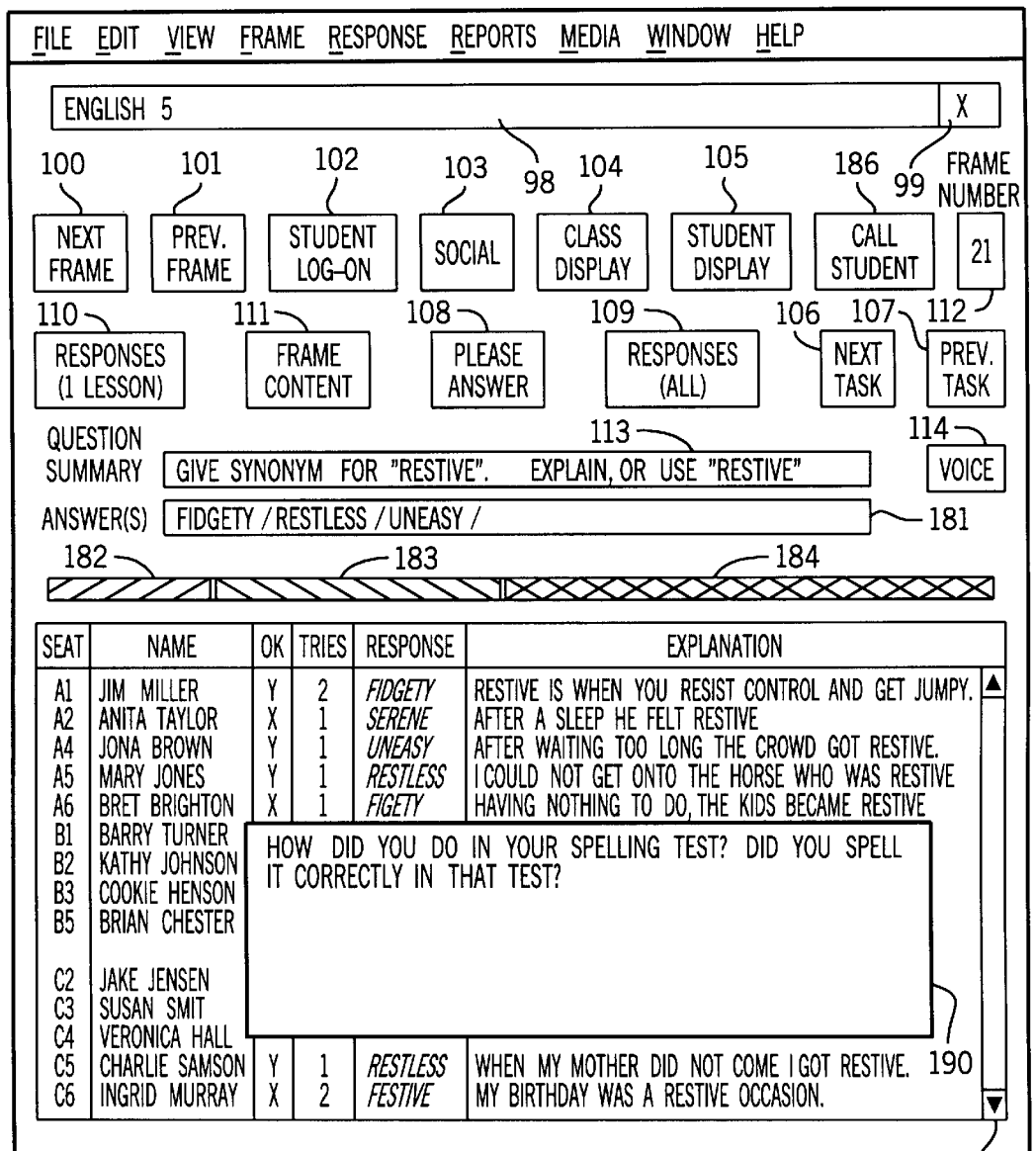
FIG. 15 shows the response screen display of FIG. 14 with an open message window.

If the teacher blocks a student's name in FIG. 14, and then presses the Call Student button, 186, a message window opens as shown in FIG. 15.

FIG. 15 shows a Response screen display with an open message window 190 for student Bret Brighton, in which the teacher can write a private message, as shown. As soon as the window opens, a control message is sent to the student computer of Bret, so that a message window opens on the student's screen 11, as shown in FIG. 16 and the student cannot proceed with his response to the frame.

Figure 16:
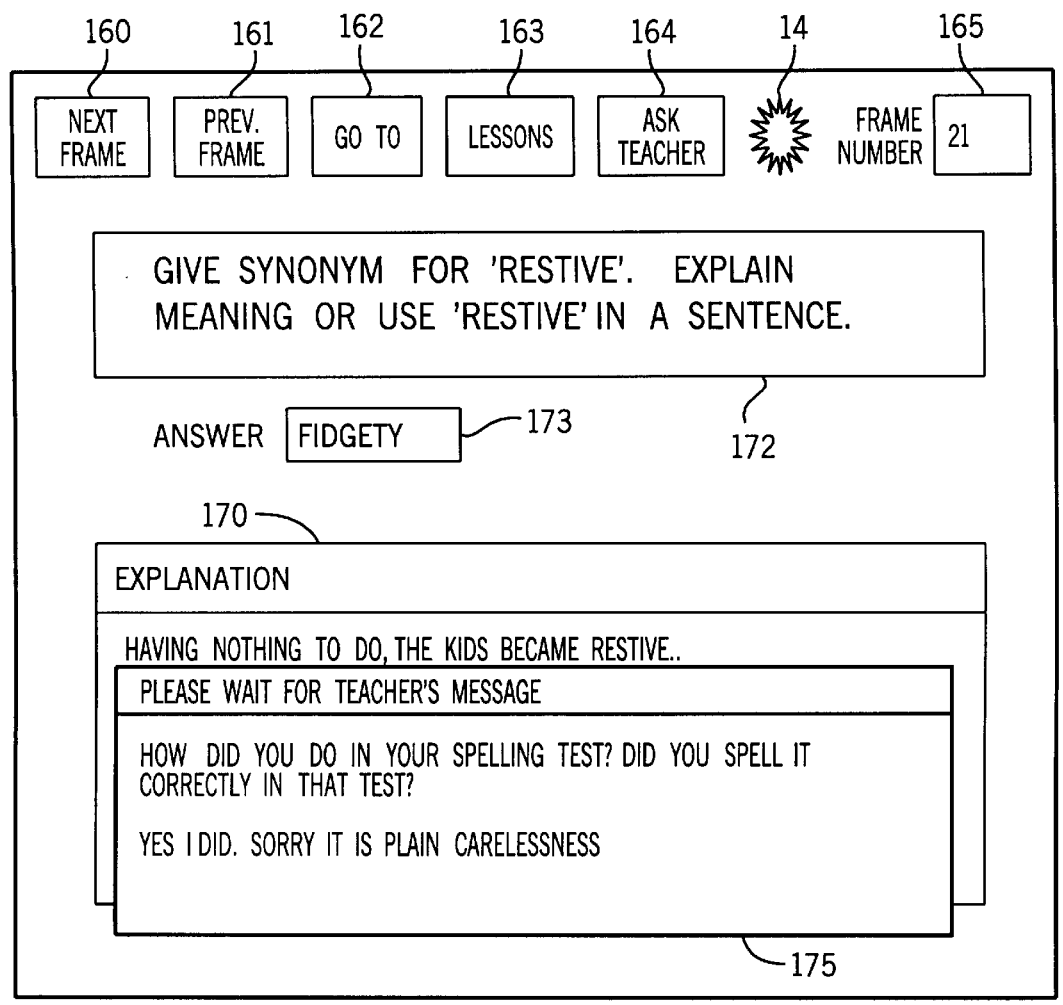
FIG. 16 shows a student's screen with a teacher's private message window.

FIG. 16 shows the student's screen 11 with the teacher's private message "How did you . . . etc." of FIG. 15, now appearing in window 175. The student is able to reply "Yes, I did . . . etc.," and the reply is ignored by the comparison and evaluation logic of FIG. 4, in the same way as the explanation in the Explanation data entry/display area 170 is ignored. The student's reply is transmitted to the teacher and appears in window 190 in FIG. 15.

Figure 17:
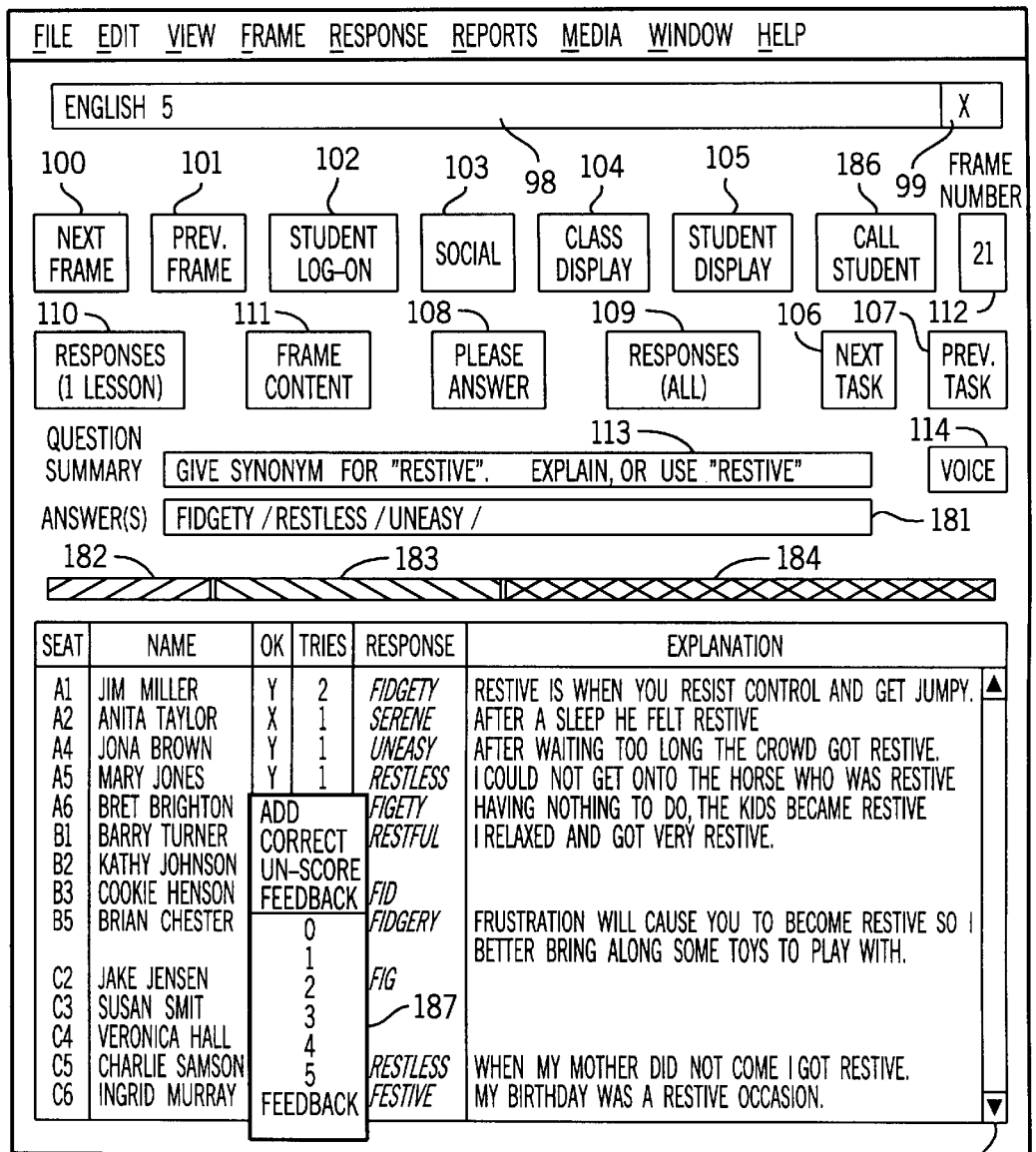
FIG. 17 shows a response screen with an on-line score window.

If a teacher blocks a student's name in FIG. 14 and then clicks on the OK column in line with the name, an On-Line Score window 187 opens as shown in FIG. 17, to enable scoring of the associated response and the giving of reinforcement feedback to the student. Alternatively, one can click directly in the OK column for window 187 to appear.

FIG. 17 shows a Response screen display with an open, On-line Score window 187. The window 187 has several items with a dividing line between them. Above the line are menu choices which effect all the students while below the line, only the students whose response has been selected, are effected. When the command 'Add' in window 187 is selected, it causes the selected response, to be added to the Answer(s) field 181 and to the Answer(s) buffer 60 in FIG. 3b of the particular frame, so that all students who have, or will have this response, are scored correct, their responses turn green, and in the OK column the X is changed to Y. This is achieved by causing part of the comparison and evaluation logic of FIG. 4, to re-score each response against the response added to the Answer buffer 60. In practice this "Add" command is most useful for unanticipated correct responses.

Choosing the "Correct" command in window 187 of FIG. 17, will score all students as correct whose response is the same as the selected response, however it will not modify the authored lesson by adding the response to the Answer(s) buffer 60 in FIG. 3b. In other words, the comparison and evaluation logic of FIG. 4, modified to deal with completed responses, is used for comparing each student response with a particular selected response and then scoring accordingly.

The Unscore command in window 187 of FIG. 17, will score all students whose response is the same as the selected response as incorrect, thereby also turning these responses red and placing an X in the OK column. This is used when the teacher mistakenly scores an incorrect response as correct.

The Feedback command above the dividing line in window 187 of FIG. 17 will supply Final-letter Reinforcement Mode feedback to all students who are scored as correct, even if the Reinforcement Mode data 137 in FIG. 8 were set to None when the frame was authored. This delay in supplying feedback to the students is a strategy designed to avoid copying of responses, one from the other, since no student can be sure what is the correct response up to the last moment.

The Options "0" to "5" are intended for individual students. Thus, if each correct answer is worth five points as shown in drop-down list box 140 in FIG. 8, the teacher may decide that, for example, Bret Brighton in seat A6 in FIG. 14 deserves an intermediate score below five, such as four points since he is conceptually correct but his spelling of "fidgety" is wrong. Another student might be awarded three points for a misspelled word if there is some doubt about whether the student is conceptually correct.

The last feedback command in FIG. 17 is intended for the teacher to give positive reinforcement feedback to only one student, whose response may be barely acceptable, however, because the student may have a learning disability, the teacher may wish to encourage the student's efforts and treat this student selectively differently.

Figure 18:
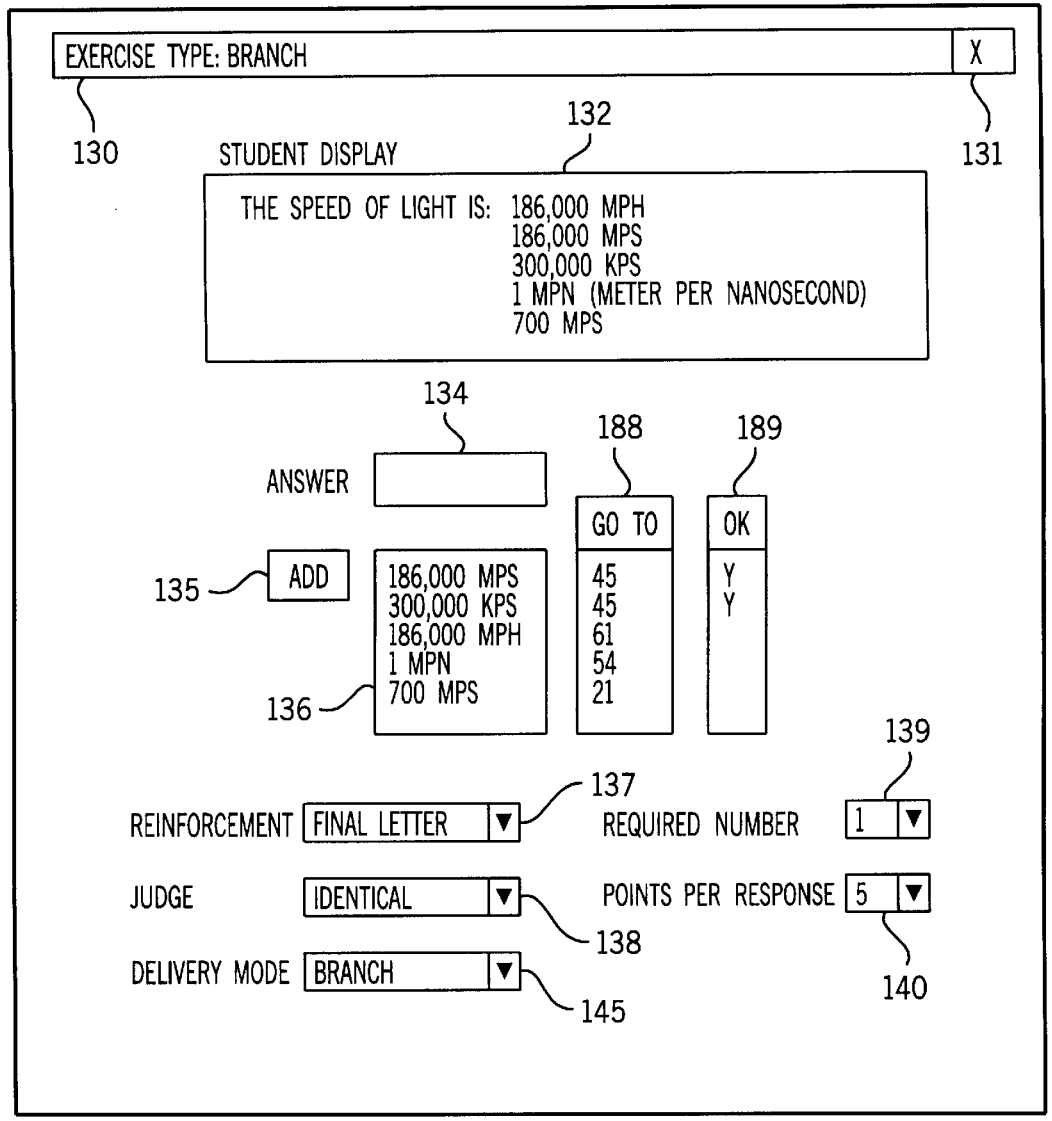
FIG. 18 shows the edit window for a branch exercise type.

FIG. 18 shows an Edit window for a Branch exercise type. Since a Branch exercise is a Self-paced activity, the use of the Class Display area 133 and selection of a Media Device in box 142 of FIG. 8, by the teacher, is unlikely and is therefore absent, but the method of listing the answers is the same, except that in the Branch exercise, the Answers include potential right and wrong answers. Two columns are added in this window: the Go To column 188 shows the frame to which the student is sent, if the student's response is that shown in the same line in the Answer field 136. The OK column 189 indicates which are the correct answers, so that proper scoring and Reinforcement Feedback can be given for the correct answer. In FIG. 18, from drop-down list box 139 it is seen that one response is required. Hence, the student must respond with either the first or the second answer in the list of Answers 136 in order to be correct, and if he does so, he will be sent to frame 45, as seen in column 188.

The student's screen is the same as that in FIG. 11, except that no Previous Frame button 161 is present since the Branch frame determines how the student should proceed in the lesson. Thus, should the student give a correct response, the student will immediately receive Final Letter Reinforcement as indicated in list box 137 in FIG. 18. In order to continue with the lesson, the student actuates the Next Frame button 160 in FIG. 11, which automatically sends him to one of the frames listed in column 188.

FIG. 21 is a summary of reports available from the Reports pull-down menu of FIG. 14. Each report opens a window with the menu choices shown on the right in FIG. 21. A quantitative display that does not necessarily involve student scores, is the Response Distribution Report, which can be obtained for virtually any Exercise type, including a verbal open-ended question, such as "Which president do you believe contributed most to the way the American people believe and act today?" This question has no unique "correct" answer. By comparing each response with every other response, using part of the comparison and evaluation logic of FIG. 4, repeatedly for each comparison, a frequency count is made for each president mentioned. A text printout or a bar graph or a pie chart can be drawn, as stated in FIG. 21, based on the frequencies of each response.

The scores obtained in examinations are not the only measure for judging student performance. An important measure is the Student Activity Report, shown at the bottom in FIG. 21, which lists the time taken on each lesson by each student, the number of responses given in Social Mode work and in Self-paced work, the number of characters in each response and the number of Social Mode questions asked by the teacher. Most of these statistics, including length of responses, can be derived from the data in Response buffer 51 in FIG. 3a. However, an additional facility for the Student Activity Report is needed to measure time. This is done by allocating to each student at least two small, Time Record buffers. Thus, one stamps the time a student types the first character after the student starts working on a lesson, and this time-stamp is recorded in the first Time Record buffer. Then one stamps the time for each subsequent keystroke, however, one keeps overwriting this time in the second time record buffer. In this way the last keystroke time is recorded for the lesson. Of course, one can keep a record on the time taken on each frame, but usually the time taken on the whole lesson is sufficient.

Before using the system there may be administrative tasks which are prepared off-line, such as allocation of Log-on ID's and passwords to teachers and students.

In operation the teacher is presented with a Log-on dialog which requires the teacher to enter his/her name, (and usually a Log-on ID and password) and, in one embodiment, a Location Address. The teacher is next presented with the Frame Content User Interface of FIG. 5 (with all drop-down list boxes closed).

To enable the log-on of students in a system that does not use a Location Address, the teacher, in a multi-teacher system, presses the Student Log-On key 102 in FIG. 5, which presents the Class Roster Names list shown in FIG. 6, from which the teacher selects a particular Class Roster, and all students who have not yet logged on are presented with a log-on dialog, which requires the students to enter their names (and usually Log-on ID's and passwords). Only if a student's name (cross-referenced to a Log-on ID and/or a password) appears on the Class Roster selected by the teacher, is the student enabled to log on, and thereby join the teacher in a class. If, however, the teacher logged on with a Location Address, the students can at any time initiate a log-on procedure and be presented with the logon dialog of FIG. 7, and as long as they enter the same Location Address as the teacher entered, they will become part of this teacher's class.

To be able to display the students' seat numbers opposite student names on the Response Screen shown in FIG. 14, particularly in a system where student computers do not have a fixed location, students have to enter the Seat numbers in the log-on dialog of FIG. 7, one source of information coming from a conceptual X-Y matrix created by markings in the room. Where remotely located students are required to log-on via the Internet, the communication protocol is preferably TCP/IP and students use a browser and log-on in substantially the same way as local students, while the assignment of seat numbers is arbitrary.

A teacher may open one or more lessons using the Open command of the Files pull-down menu of FIG. 5, or decide to teach without any pre-authored lesson. Opening a lesson may be for the purpose of editing it or for making it available to the students. In the latter case, an additional lesson Unlock button may be used. The students, who have logged on and are associated with the teacher, can now use the Lessons button 163 of FIGS. 9, 11 or 13, to select the lesson desired, out of all the lessons opened (and unlocked) by the teacher.

After students have logged on, the teacher can start teaching spontaneously in Social Mode even without a pre-authored lesson, by actuating the Social button 103 in FIG. 5, asking a question verbally, and then actuating the Please Answer button 108 in FIG. 5. The students type their responses on their keyboards 10 of FIG. 1 or 2, and their responses are sent, character by character, to response server 6 in FIG. 2, from where it is displayed on the teacher's monitor 3, with the help of the main application program 4 or teacher's computer client program 34, in FIGS. 1 and 2. The display on the teacher's monitor 3 is organized as shown in FIG. 14, except that the OK and Tried columns are empty and the responses are in blue since there are no authored answers on which to do comparison and evaluation of the responses. The performance bar 184 occupies the total width normally occupied by 162, 183 and 184, and shows a 100% blue bar, since as yet student responses are not marked right or wrong.

The teacher may now, while on-line, score these responses by clicking in the OK column of FIG. 17, opposite the name of a student with a correct response, and then clicking on the Add command shown in window 187. This not only scores all students with the same response as correct, but also places this response into the answer(s) field 181 and the Answer(s) buffer 60 in FIG. 3b. Also feedback to the students can be provided through the feedback commands shown in FIG. 17.

After pressing Next Frame button 100 in FIG. 17 to get to a new frame, this procedure of asking a question verbally, on-line scoring and adding the correct response to the Answer(s) buffer 60, can be repeated. This means that a teacher can teach on-line, virtually any subject spontaneously without any pre-authored lesson while receiving a quantitative report on performance. Another by-product is that in this way an elementary lesson comprising a multiplicity of frames holding answers can be built up, for use in another class.

For this lesson, produced as a by-product, to be useful to another teacher, it is necessary to have the questions recorded as well. This is achieved by clicking Voice button 114 in FIG. 5 and speaking the question into the microphone 36 of FIG. 1, which causes the question to appear as text in the Question/Summary work area 113 of FIG. 5. Clicking the Voice button 114 again stops the voice-to-text conversion. Thus, there is a complete record and performance statistics on spontaneously created frames, including written questions and answers. In other words, whereas in the past a teacher could not teach a subject with the aid of computers unless pre-authored courseware was available, a teacher can now teach spontaneously and, in addition, leave the classroom with an authored lesson with questions, which could be repeated with another class of students.

A student may be required to give an explanation of the response to a question. To create a frame of this type, the Explanation box 141 in FIG. 8 is checked after pressing the Edit key 120 in Frame Content User Interface of FIG. 5. When the student receives this frame, an Explanation work area 170, as shown in FIG. 9, is created for the student. Whether scoring is done automatically or should the teacher, while on-line, score a student's response using the All or Correct commands, as described with reference to FIG. 17, only the response(s) written outside the Explanation work area 171 is scored by the main part of the comparison and evaluation logic of FIG. 4, while the explanation is ignored because the transmission of the X-Y co-ordinates enable a distinction to be made between a response and an explanation.

There are some complex exercise types which can be authored with a minimum number of strokes. One of these is a Fill-in-the-blanks exercise where the text, including the words to be filled in, are written without special regard for spacing as shown in FIG. 10, and thereafter the words to be filled in are blocked and finally the transfer button 147 is pressed, causing the answers which are to be filled in, to be stored in Answer(s) buffer 60 of FIG. 3b. The text, minus the words to be filled in, now appear as shown in the example in FIG. 11 when the student receives the frame.

Another exercise is a Route exercise, where it applies to the placing of individual characters in different patterns, such as long multiplication or the filling in of missing characters in an algebraic expression. As shown in FIG. 12, the expression including the characters to be filled in, is written and then the characters to be filled in are selected with a mouse, character-by-character, in the order in which they are to be filled in, and at the same time transferred to the Answer buffer 60 of FIG. 3b, character by character. The text, minus the characters to be filled in, now appears as shown in the example in FIG. 13, when the student receives the frame.

A teacher may author a lesson comprising several frames, using different Delivery Modes, 73–77, as shown in FIG. 3b, with the help of drop-down list box 145 in FIG. 8. of particular interest to the present invention is where the teacher uses particular frames in Social Mode, e.g. those numbered "Frame 5", "Frame 91" and "Frame 13" to explain a concept and the intermediate numbered "Frame 6", "Frame 7", "Frame 8", "Frame 10", "Frame 11" and "Frame 12", for student drill-and-practice, in Hybrid Mode which is a self-paced activity. Thus, the teacher may demonstrate long multiplication on "Frame 5" via a message in the Class Display area 133, and also let the students do the exercise shown in FIG. 12 in Social Mode, and then let the students do three self-paced, long multiplication exercises, on "Frame 6", "Frame 7" and "Frame 8" in Hybrid Mode. When working in the Hybrid Mode, the students have only the Next Frame button 160 and Previous Frame button 161 available, as shown in FIG. 11, as this helps to logically bar them from addressing themselves to any frames other than the three frames between "Frame 5" and "Frame 9", which are in Social Mode.

If successive frames in a lesson are authored in Social Mode, the teacher can deliver such a lesson in one of three ways. The first is to advance, frame by frame, to numerically successive frames using the Next button 100 in FIG. 5, and, on each frame, utilize the Class Display 5 and the Class Display button 104 to display the message authored in Class Display work area 121, or Start button 131 to play Media, e.g. Video Disk.

The second is to add to the lesson, when saving it by means of the Save command in the Files pull-down menu, combination operational commands to eliminate operational steps which in themselves make no educational contribution. These combination operational commands are executed with the Next Task button 106 and Previous Task button 107 in FIGS. 5 or 14, so that with only one click of a mouse, one can, for example, advance from pressing the Please Answer button on one frame, to the class display 5 of a message and the actuation of the Please Answer button on another frame.

The third way of delivering a lesson is to produce a teacher's manual with bar codes on paper, relating to the lesson. The bar codes represent combination operational commands and are interspersed with the text. By the use of a hand held bar code reader, the teacher delivers the lesson, without needing to know the functions of each button on the screen User Interface.

Whatever Delivery Mode students work in, whether Social or Self-paced, the color-coded responses of a multiplicity of students can be viewed by the teacher on the dynamic Response screen display of FIG. 14, which applies to a particular frame of a particular lesson. The responses are color-coded because correct responses, incorrect responses and responses which have not yet been matched against authored answers, all appear in different colors or fonts. The screen view is dynamic because it is constantly updated as the students are typing. The columns on the Response screen display include seat number column, student name column, the OK column and Tries column to indicate the correctness of each response and the number of tries made in answering the question. The presence of the Explanation column depends on whether the Explanation box 141 in FIG. 8 was checked. Three color-coded performance bars 182, 183 and 184 in FIG. 14, indicate the percentages of students who have responded correctly, incorrectly and who have not responded. Clicking on each of these performance bars, sorts the order of student names according to which bar was pressed.

By pressing the Responses (All) button 109 in FIG. 14, the responses of a screen full of students working on all the lessons can be viewed dynamically in order to establish on which frame from which lesson each student is working on.

If students are working in Self-paced, the teacher may select or highlight a student's name by clicking on it, and then clicking on the Call Student button 186 of FIG. 14. This opens a window 190, as in FIG. 15, on the teacher's monitor 3, and a window on the student's screen 11, as shown in FIG. 16. The teacher then types a message in window 190 in FIG. 15, which is also transmitted to the relevant student computer 9, 21, so that it appears on the student's screen in a window 175 as shown in FIG. 16, and interrupts the student. The student can reply by typing a message in window 175, and the reply is transmitted to the teacher's computer 1, and thence to the teacher's window 190 in FIG. 15.

While viewing a Response screen display where a student has been scored incorrect by virtue of this student's response not matching any of the authored correct responses, the teacher can arbitrarily award an intermediate or a full score to this student alone, without effecting the scores of other students having the same response. This is done by clicking in the OK column of the relevant student's name, and then clicking on the desired score in the On-Line Score window which appears, as shown, in FIG. 17. The same window facilitates awarding a reinforcement feedback signal selectively to one or all the students.

Note that while scores appear in the OK column in FIGS. 14 and 17, the Student Score buffer 49 of FIG. 3*a* is updated. Thus, beside the Responses screen display described in FIG. 14, one can construct for example, a Dynamic Summary Report screen display (Summary Report, Dynamic in FIG. 21) showing a grid, which on the vertical axis shows seat numbers and student names, as in FIG. 14, and, on the horizontal axis, the scores on each frame. This is useful to see at a glance how a whole class progresses and who is falling behind in a self-paced test.

Of particular interest in On-line teaching is the use of a Response Distribution Report of FIG. 21. This can be obtained in the form of a text report or bar graph or pie chart based on the frequencies of responses to an open ended, spontaneous, verbal question such as "Which president do you believe contributed most to the way the American people believe and act today?" When doing this exercise in combination with checking the Explanation box 141 of FIG. 8, the teacher not only obtains a deeper insight into students' thinking, but can also use the Online score facility, using a number "0" to "5" as explained with reference to window 187 in FIG. 17. Here the score is based on the teacher's subjective opinion of the explanation and not on the direct response to the question (which is the name of the president), as is the case with conventional computer based systems. This demonstrates the power of the present on-line teaching and learning system even without pre-authored courseware.

One can also print out a variety of reports since, at the end of the lesson all responses, changes to lessons and scores are saved, with a Save As command under the Files pull-down menu, and thereby transferring the data from the response server 6 to the database server 7. The reports, including long range reports and graphs on the performance of individual students and classes over a period of time, can be constructed with the help of a variety of third party programs.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

I claim:

1. In a networked teaching and learning system having a plurality of student computers, each having an input device and a screen and having at least one teacher's computer including an input device and a screen, the system further comprising:

output elements controlled by the student computers for transmitting learning reinforcement signals to the students;

a packet-switched, interrupt-driven, communication protocol for communicating between the teacher's computer and the student computers through the network;

wherein the teacher's computer includes program instructions responsive to teacher inputs to transmit a question to each of the student computers;

wherein the student computers immediately transmit each student keystroke without waiting for the next keystroke;

the system further comprising comparison and evaluation logic in communication with the student computers for receiving student keystrokes of a multi-character student response and for comparing and evaluating each of said student keystrokes with a homologous character of at least one multi-character teacher-designated answer to the question, immediately after each student keystroke; and wherein the student computers are immediately responsive to evaluation of each student keystroke by the comparison and evaluation logic to signal the student through at least one of the output elements with at least one learning reinforcement signal.

2. The system of claim 1, where the comparison and evaluation logic is located centrally in the network.

3. The system of claim 1, where the comparison and evaluation logic is located locally at each student computer.

4. The system of claim 1, where the system includes a common database server, for all teacher computers.

5. The system of claim 1, in which the packet switched protocol is TCP/IP.

6. The system of claim 1, in which at least one student computer is connected via an Internet service provider to the Internet.

7. The system of claim 6, where the comparison and evaluation logic is installed at the student computer via the Internet as an applet.

8. The system of claim 6, where comparison and evaluation logic is installed at the student computer via the Internet as a plug-in module.

9. The system of claim 6, where comparison and evaluation logic is installed at the student computer via the Internet as a helper application.

10. The system of claim 1, where the output devices provide predetermined learning reinforcement signals.

11. The system of claim 1, wherein the teacher's computer includes authoring program instructions for forming and transmitting a frame comprising various distinguishable components, including a judging component and a reinforcement component.

12. The system of claim 11, wherein the various distinguishable components include a delivery component.

13. The system of claim 11, in which the authoring program instructions within the teacher's computer, include instructions for creating an explanation component in addition to the multi-character answer.

14. The system of claim 13 in which the transmission of a frame with an explanation component to a student computer causes the display of a student screen display with both a response work area and an explanation work area, and wherein the comparison and evaluation logic is responsive to inputs to respective work areas to distinguish between inputs to the respective work areas.

15. The system of claim 11, in which the authoring program instructions includes further instructions for creating, in the same lesson, numbered frames with a hybrid mode component and numbered frames with a social mode component, enabling the independent self-paced addressing at the student computer, of only the contiguous hybrid mode frames, whose numbers lie between the two social mode frames that precede and follow the contiguous hybrid mode frames being addressed.

16. The system of claim 1, further comprising a response buffer in communication with the student computers, and wherein the teacher's computer executes program instructions for displaying color-coded responses from the response buffer for a multiplicity of students simultaneously, while students are responding, as well as displaying associated scoring data for each student.

17. The system of claim 16, where the comparison and evaluation logic is located both centrally in the network, to determine the color coding of the responses, and locally at the student computers, to determine the immediate reinforcement feedback at each student computer.

18. The system of claim 16, in which the teacher's computer includes program instructions that are responsive to student inputs for displaying a bar graph with color-coded sections and wherein said color-coded sections can be individually selected to cause sorting and display of the color-coded responses in color-coded groups corresponding to the sections of the bar graph.

19. The system of claim 1, in which the teacher's computer includes a next task button, which is responsive to a teacher input to enable the execution in a single operational command a multiplicity of authored combination operational commands, for advancing through a social mode lesson, from one state of the system on one frame, to another state of the system on another frame.

20. The system of claim 1, in which the teacher's computer includes a bar-code reader which enables the reading of encoded combination operational commands, and program instructions responsive to a single bar scan for advancing through a social mode lesson, from one state of the system on one frame to another state of the system on another frame.

21. The system of claim 1, further comprising a response buffer in communication with the student computers for receiving student responses, and wherein the teacher's computer executes program instructions for displaying responses from the response buffer for a multiplicity of students simultaneously, while the students are responding, as well as displaying associated scoring data for each student, and in which the teacher's computer includes program instructions that are responsive to teacher inputs, for overriding and modifying the scoring data for a respective student as it is displayed on the screen of the teacher's computer.

22. The system of claim 21, wherein the comparison and evaluation logic further includes means for comparing each student response with a particular selected response and scoring accordingly.

23. The system of claim 22, wherein the system further comprises an answer buffer and wherein the student response is added to the answer buffer as the teacher-designated answer.

24. The system of claim 22, further comprising means for supplying reinforcement feedback according to the scores.

25. The system of claim 21, further comprising means for supplying arbitrarily, on-line, with the aid of the teacher's computer input device, reinforcement feedback at a student computer based on the scoring data.

26. The system of claim 1, wherein the comparison and evaluation logic further includes means for comparing each student response with all other responses, and displaying a frequency distribution of responses.

27. The system of claim 1, further comprising a response buffer in communication with the student computers for receiving student responses, and wherein the teacher's computer executes program instructions for displaying responses from the response buffer for a multiplicity of students simultaneously, while the students are responding, and further comprising means for selecting the name of a student associated with a response, and further comprising a means for opening a window on the teacher's computer monitor and a window on the student computer screen, enabling two way transmission of messages between the two windows in real time.

28. The system of claim 1, further comprising a response buffer in communication with the student computers for receiving student responses, and wherein the teacher's computer executes program instructions for displaying responses from the response buffer for a multiplicity of students simultaneously, while the students are responding, and further comprising program instructions in the teacher's computer responsive to a selection of a response for broadcasting the selection to the screens of the student computers.

29. The system of claim 1, further comprising program instructions for time-stamping each and every keystroke, of the responses to a lesson, on the student computers.

30. A method of presenting, in an on-line, multi-teacher, multi-student networked computer system, a lesson to each student, comprising:
    logging on a plurality of teachers to the networked computer system;
    selecting by a teacher on each teacher's screen a class roster of students from a multiplicity of class rosters stored in a database in a central computer;
    logging on a plurality of students to the networked computer system;
    selecting by a teacher on each teacher's screen a list of lessons from a multiplicity of lessons stored in the database in a central computer;
    displaying the list of lessons selected by each respective teacher on the screens of each student who has logged on and who is included in the respective class roster; and
    selecting of a lesson by each student from the list of lessons displayed.

31. The method of claim 30, wherein the logging in of the plurality of students includes entering a seat number for each of the respective students.

32. A method of logging on students to an online, multi-teacher, multi-student networked computer system, comprising:
    each teacher logging on using a log-on dialog box and entering a location address in the log-on dialog box;
    each student entering a location address for the respective student through a student log-on dialog box, the system responding to allow logging in of a student if the location address of the student matches the location address of a respective teacher.

33. The method of claim 32, where a seat number for each respective student is entered via the student log-on dialog.

34. A method of authoring at a teacher's computer of a teaching and learning computer system, a fill-in-the-blanks exercise type frame, comprising:
    writing in a work area a message, which includes the answers to be filled in;
    selecting the answers for executing further computer operations; and
    automatically transferring the selected answers to an answer buffer while recording their location and stripping the answers from the message, leaving a designated blank space in place of each answer selected and transmitting the exercise to the student computers.

35. A method of authoring at a teacher's computer of a teaching and learning computer system, a route exercise type frame, comprising:
    writing in a work area a message, which includes the characters to be filled in;
    selecting the characters for executing further computer operations, one at a time, in the order in which they are required to be filled in by the students; automatically transferring the selected characters to an answer buffer while recording their location and stripping the selected characters from the message; leaving a designated blank space in place of each character selected and transmitting the exercise to the student computers.

36. A method of authoring at a teacher's computer of a teaching and learning computer system, a branch exercise type frame, comprising:
    displaying the potential answers in an answer area displayed on a screen of the teacher's computer;
        wherein the teacher's computer is programmed to respond to entry of a frame number associated with each potential answer to display said frame number in a frame number area displayed on a screen of the teacher's computer;
    wherein the teacher's computer is responsive for examining each potential answer and displaying whether each potential answer is a correct answer in a correct answer area;
    wherein the teacher's computer provides a portion of a screen display indicating the number of correct answers required; and
    wherein the teacher's computer is responsive to the entry of mode selection data to select a type of automatic reinforcement feedback to be given immediately after the last character of a correct response is entered.

37. A method for online teaching and learning, the method comprising:
    communicating between a teacher's computer and a plurality of student computers through a network using a packet-switched, interrupt-driven, communication protocol;
    transmitting a question to each of the student computers;
    transmitting each student keystroke from the student computers without waiting for the next keystroke;
    receiving student keystrokes in a multi-character student response and comparing and evaluating each of said student keystrokes with a character of at least one multi-character teacher-designated answer to the question, immediately after each student keystroke; and
    responding to evaluation of each student keystroke by the comparison and evaluation logic to signal the student with at least one learning reinforcement signal.

* * * * *